US008422546B2

(12) United States Patent
Lin et al.

(10) Patent No.: US 8,422,546 B2
(45) Date of Patent: Apr. 16, 2013

(54) ADAPTIVE VIDEO ENCODING USING A PERCEPTUAL MODEL

(75) Inventors: Chih-Lung Lin, Redmond, WA (US);
Minghui Xia, Bellevue, WA (US);
Pohsiang Hsu, Redmond, WA (US);
Shou-Jen Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1418 days.

(21) Appl. No.: 11/137,924

(22) Filed: May 25, 2005

(65) Prior Publication Data

US 2006/0268990 A1    Nov. 30, 2006

(51) Int. Cl.
*H04B 1/66* (2006.01)

(52) U.S. Cl.
USPC ............. 375/240; 375/240.04; 375/240.03; 375/240.02; 375/240.06; 375/240.12; 382/251; 382/239; 382/238; 382/240

(58) Field of Classification Search ........... 375/240, 375/240.04, 240.03, 240.02, 240.06, 240.12; 382/251, 239, 238, 240.12, 240
See application file for complete search history.

(56) References Cited

U.S. PATENT DOCUMENTS

| 762,026 A | 6/1904 | Connstein |
| 4,583,114 A | 4/1986 | Catros |
| 4,679,079 A | 7/1987 | Catros et al. |
| 4,774,574 A | 9/1988 | Daly et al. |
| 4,821,119 A * | 4/1989 | Gharavi ................ 375/240.16 |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |
| 5,128,758 A | 7/1992 | Azadegan et al. |
| 5,136,377 A | 8/1992 | Johnston et al. |
| 5,144,426 A | 9/1992 | Tanaka et al. |
| 5,146,324 A | 9/1992 | Miller et al. |
| 5,179,442 A | 1/1993 | Azadegan et al. |
| 5,237,410 A | 8/1993 | Inoue |
| 5,241,395 A | 8/1993 | Chen |

(Continued)

FOREIGN PATENT DOCUMENTS

| CA | 1327074 | 2/1994 |
| EP | 0932306 | 7/1999 |

(Continued)

OTHER PUBLICATIONS

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

(Continued)

*Primary Examiner* — Shawn An
(74) *Attorney, Agent, or Firm* — Klarquist Sparkman, LLP

(57) ABSTRACT

A video encoder includes a region detector module that classifies blocks of video frames. An adaptive filter module applies a median filter to a block based upon a block classification assigned by the region detector module. An adaptive quantization module quantizes a block according to a quantization method adaptively determined based upon a block classification assigned by the region detection module. In one example, a video encoder adaptively determines a median filter selected using a block classification. In another example, a video encoder adaptively determines whether to drop an isolated last transform coefficient based on the block classification, and/or applies a dead-zone selected using the block classification.

26 Claims, 12 Drawing Sheets

U.S. PATENT DOCUMENTS

| | | | |
|---|---|---|---|
| 5,253,058 A | 10/1993 | Gharavi | |
| 5,263,088 A | 11/1993 | Hazu et al. | |
| 5,301,242 A | 4/1994 | Gonzales et al. | |
| 5,303,058 A | 4/1994 | Fukuda et al. | |
| 5,317,396 A | 5/1994 | Fujinami | |
| 5,317,672 A | 5/1994 | Crossman et al. | |
| 5,333,212 A | 7/1994 | Ligtenberg | |
| 5,351,310 A | 9/1994 | Califano et al. | |
| 5,374,958 A | 12/1994 | Yanagihara | |
| 5,412,429 A | 5/1995 | Glover | |
| 5,452,104 A | 9/1995 | Lee | |
| 5,461,421 A | 10/1995 | Moon | |
| 5,473,377 A | 12/1995 | Kim | |
| 5,481,553 A | 1/1996 | Suzuki et al. | |
| 5,506,916 A | 4/1996 | Nishihara et al. | |
| 5,510,785 A | 4/1996 | Segawa et al. | |
| 5,537,440 A | 7/1996 | Eyuboglu et al. | |
| 5,537,493 A | 7/1996 | Wilkinson | |
| 5,539,469 A * | 7/1996 | Jung | 375/240.14 |
| 5,559,557 A | 9/1996 | Kato | |
| 5,565,920 A | 10/1996 | Lee et al. | |
| 5,587,708 A | 12/1996 | Chiu | |
| 5,606,371 A | 2/1997 | Gunnewick et al. | |
| 5,623,424 A | 4/1997 | Azadegan et al. | |
| 5,631,644 A | 5/1997 | Katata et al. | |
| 5,654,760 A | 8/1997 | Ohtsuki | |
| 5,657,087 A | 8/1997 | Jeong et al. | |
| 5,663,763 A | 9/1997 | Yagasaki et al. | |
| 5,724,097 A * | 3/1998 | Hibi et al. | 375/240.04 |
| 5,724,456 A | 3/1998 | Boyack et al. | |
| 5,731,836 A | 3/1998 | Lee | |
| 5,731,837 A | 3/1998 | Hurst, Jr. | |
| 5,739,861 A | 4/1998 | Music | |
| 5,751,358 A | 5/1998 | Suzuki et al. | |
| 5,751,379 A | 5/1998 | Markandey et al. | |
| 5,761,088 A | 6/1998 | Hulyalkar et al. | |
| 5,764,803 A | 6/1998 | Jacquin et al. | |
| 5,781,788 A | 7/1998 | Woo et al. | |
| 5,786,856 A | 7/1998 | Hall et al. | |
| 5,802,213 A | 9/1998 | Gardos | |
| 5,809,178 A | 9/1998 | Anderson et al. | |
| 5,815,097 A | 9/1998 | Schwartz et al. | |
| 5,819,035 A | 10/1998 | Devaney et al. | |
| 5,825,310 A | 10/1998 | Tsutsui | |
| 5,835,145 A | 11/1998 | Ouyang et al. | |
| 5,835,237 A | 11/1998 | Ebrahimi | |
| 5,844,613 A | 12/1998 | Chaddha | |
| 5,850,482 A | 12/1998 | Meany et al. | |
| 5,867,167 A | 2/1999 | Deering | |
| 5,870,435 A | 2/1999 | Choi et al. | |
| 5,877,813 A * | 3/1999 | Lee et al. | 375/240.12 |
| 5,878,166 A | 3/1999 | Legall | |
| 5,880,775 A | 3/1999 | Ross | |
| 5,883,672 A | 3/1999 | Suzuki et al. | |
| 5,926,791 A | 7/1999 | Ogata et al. | |
| 5,969,764 A | 10/1999 | Sun et al. | |
| 5,970,173 A | 10/1999 | Lee et al. | |
| 5,990,957 A | 11/1999 | Ryoo | |
| 6,044,115 A | 3/2000 | Horiike et al. | |
| 6,049,630 A | 4/2000 | Wang et al. | |
| 6,058,362 A | 5/2000 | Malvar | |
| 6,072,831 A | 6/2000 | Chen | |
| 6,084,636 A | 7/2000 | Fujiwara | |
| 6,088,392 A | 7/2000 | Rosenberg | |
| 6,091,777 A | 7/2000 | Guetz et al. | |
| 6,104,751 A | 8/2000 | Artieri | |
| 6,118,817 A | 9/2000 | Wang | |
| 6,118,903 A | 9/2000 | Liu | |
| 6,125,140 A | 9/2000 | Wilkinson | |
| 6,148,107 A | 11/2000 | Ducloux et al. | |
| 6,148,109 A | 11/2000 | Boon et al. | |
| 6,160,846 A | 12/2000 | Chiang et al. | |
| 6,167,091 A | 12/2000 | Okada et al. | |
| 6,182,034 B1 | 1/2001 | Malvar | |
| 6,212,232 B1 | 4/2001 | Reed et al. | |
| 6,215,905 B1 | 4/2001 | Lee et al. | |
| 6,223,162 B1 | 4/2001 | Chen et al. | |
| 6,240,135 B1 | 5/2001 | Kim | |
| 6,240,380 B1 | 5/2001 | Malvar | |
| 6,243,497 B1 | 6/2001 | Chiang et al. | |
| 6,249,614 B1 | 6/2001 | Bocharova et al. | |
| 6,256,422 B1 | 7/2001 | Mitchell et al. | |
| 6,256,423 B1 | 7/2001 | Krishnamurthy | |
| 6,263,022 B1 | 7/2001 | Chen et al. | |
| 6,263,024 B1 | 7/2001 | Matsumoto | |
| 6,275,614 B1 | 8/2001 | Krishnamurthy et al. | |
| 6,278,735 B1 | 8/2001 | Mohsenian | |
| 6,292,588 B1 | 9/2001 | Shen et al. | |
| 6,314,208 B1 | 11/2001 | Konstantinides et al. | |
| 6,337,881 B1 | 1/2002 | Chaddha | |
| 6,347,116 B1 | 2/2002 | Haskell et al. | |
| 6,348,945 B1 | 2/2002 | Hayakawa | |
| 6,356,709 B1 | 3/2002 | Abe et al. | |
| 6,359,928 B1 | 3/2002 | Wang et al. | |
| 6,360,017 B1 | 3/2002 | Chiu et al. | |
| 6,370,502 B1 | 4/2002 | Wu et al. | |
| 6,373,894 B1 | 4/2002 | Florencio et al. | |
| 6,385,343 B1 | 5/2002 | Kuroda et al. | |
| 6,389,171 B1 | 5/2002 | Washington | |
| 6,393,155 B1 | 5/2002 | Bright et al. | |
| 6,408,026 B1 | 6/2002 | Tao | |
| 6,418,166 B1 | 7/2002 | Wu et al. | |
| 6,438,167 B1 | 8/2002 | Shimizu et al. | |
| 6,456,744 B1 | 9/2002 | Lafe | |
| 6,463,100 B1 | 10/2002 | Cho et al. | |
| 6,466,620 B1 | 10/2002 | Lee | |
| 6,473,534 B1 | 10/2002 | Merhav et al. | |
| 6,490,319 B1 | 12/2002 | Yang | |
| 6,493,385 B1 | 12/2002 | Sekiguchi et al. | |
| 6,519,284 B1 | 2/2003 | Pesquet-Popescu et al. | |
| 6,526,096 B2 | 2/2003 | Lainema et al. | |
| 6,546,049 B1 | 4/2003 | Lee | |
| 6,571,019 B1 | 5/2003 | Kim et al. | |
| 6,593,925 B1 | 7/2003 | Hakura et al. | |
| 6,600,836 B1 | 7/2003 | Thyagarajan et al. | |
| 6,647,152 B2 | 11/2003 | Willis et al. | |
| 6,654,417 B1 | 11/2003 | Hui | |
| 6,678,422 B1 | 1/2004 | Sharma et al. | |
| 6,687,294 B2 | 2/2004 | Yan et al. | |
| 6,704,718 B2 | 3/2004 | Burges et al. | |
| 6,721,359 B1 | 4/2004 | Bist et al. | |
| 6,728,317 B1 | 4/2004 | Demos | |
| 6,731,811 B1 | 5/2004 | Rose | |
| 6,738,423 B1 | 5/2004 | Lainema et al. | |
| 6,747,660 B1 | 6/2004 | Olano et al. | |
| 6,759,999 B1 | 7/2004 | Doyen | |
| 6,760,482 B1 | 7/2004 | Taubman | |
| 6,765,962 B1 | 7/2004 | Lee et al. | |
| 6,771,830 B2 | 8/2004 | Goldstein et al. | |
| 6,785,331 B1 | 8/2004 | Jozawa et al. | |
| 6,788,740 B1 | 9/2004 | Van der Schaar et al. | |
| 6,792,157 B1 | 9/2004 | Koshi et al. | |
| 6,795,584 B2 | 9/2004 | Karczewicz et al. | |
| 6,801,572 B2 | 10/2004 | Yamada et al. | |
| 6,807,317 B2 | 10/2004 | Mathew et al. | |
| 6,810,083 B2 | 10/2004 | Chen et al. | |
| 6,831,947 B2 | 12/2004 | Ribas Corbera | |
| 6,862,320 B1 | 3/2005 | Isu et al. | |
| 6,865,291 B1 | 3/2005 | Zador | |
| 6,873,654 B1 | 3/2005 | Rackett | |
| 6,876,703 B2 | 4/2005 | Ismaeil et al. | |
| 6,882,753 B2 | 4/2005 | Chen et al. | |
| 6,907,142 B2 * | 6/2005 | Kalevo et al. | 382/238 |
| 6,909,745 B1 | 6/2005 | Puri et al. | |
| 6,947,045 B1 | 9/2005 | Ostermann et al. | |
| 6,975,680 B2 | 12/2005 | Demos | |
| 6,977,659 B2 | 12/2005 | Dumitras et al. | |
| 6,990,242 B2 | 1/2006 | Malvar | |
| 7,016,546 B2 | 3/2006 | Fukuhara et al. | |
| 7,020,204 B2 | 3/2006 | Auvray et al. | |
| 7,027,506 B2 | 4/2006 | Lee et al. | |
| 7,027,507 B2 | 4/2006 | Wu | |
| 7,035,473 B1 | 4/2006 | Zeng et al. | |
| 7,042,941 B1 | 5/2006 | Laksono et al. | |
| 7,058,127 B2 | 6/2006 | Lu et al. | |
| 7,099,389 B1 | 8/2006 | Yu et al. | |
| 7,110,455 B2 | 9/2006 | Wu et al. | |

| Patent/Pub No. | Date | Name |
|---|---|---|
| 7,162,096 B1 | 1/2007 | Horowitz |
| 7,200,277 B2 | 4/2007 | Joshi et al. |
| 7,289,154 B2 * | 10/2007 | Gindele ............... 348/364 |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,356,085 B2 | 4/2008 | Gavrilescu et al. |
| 7,463,780 B2 | 12/2008 | Fukuhara et al. |
| 7,471,830 B2 * | 12/2008 | Lim et al. ............... 382/181 |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1 | 2/2002 | Jayant et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1 | 9/2002 | Shimada et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Srinivasan et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen et al. |
| 2005/0031034 A1 | 2/2005 | Kamaci et al. |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268991 A1 | 11/2006 | Segall et al. |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0008394 A1 | 1/2008 | Segall |
| 2008/0031346 A1 | 2/2008 | Segall |
| 2008/0068446 A1 | 3/2008 | Barkley et al. |
| 2008/0080615 A1 | 4/2008 | Tourapis et al. |
| 2008/0089410 A1 | 4/2008 | Lu et al. |
| 2008/0101465 A1 | 5/2008 | Chono et al. |
| 2008/0187042 A1 | 8/2008 | Jasinschi |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2008/0304562 A1 | 12/2008 | Chang et al. |
| 2009/0207919 A1 | 8/2009 | Yin et al. |
| 2009/0213930 A1 | 8/2009 | Ye et al. |
| 2009/0245587 A1 | 10/2009 | Holcomb et al. |
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 1465349 | 10/2004 |
| EP | 1871113 | 12/2007 |
| GB | 897363 | 5/1962 |

| | | |
|---|---|---|
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2003061090 | 2/2003 |
| JP | 6-296275 | 10/2004 |
| JP | 07-281949 | 10/2007 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Augustine et al., "Region of Interest Editing of MPEG-2 Video Streams in the Compressed Domain," *2004 IEEE Int'l Conf. on Multimedia and Expo: ICME'04*, vol. 1, Issue 27-30, pp. 559-562 (Jun. 2004).
Bist et al., "Adaptive Quantization for Low Bit Rate Video Coding," *Proc. 1998 Int'l Conf. on Image Processing (ICIP 98)*, pp. 925-928 (Oct. 1998).
Chrysafis et al., "Context-based Adaptive Image Coding," *Proc. of the 30th Asilomar Conf. on Signals, Systems, and Computers*, 5 pp. (Nov. 1996).
De Simone, et al., "A comparative study of JPEG 2000, AVC/H.264, and HD Photo," *SPIE Optics and Photonics, Applications of Digital Image Processing XXX*, 12 pp. (Aug. 2007).
Farvardin et al., "Optimum quantizer performance for a class of non-Gaussian memoryless sources," *IEEE Trans. Inform. Theory*, vol. IT-30, No. 3, pp. 485-497 (May 1984).
Flierl et al., "A Video Codec Incorporating Block-Based Multi-Hypothesis Motion-Compensated Prediction," in *Proceedings of the SPIE Conference on Visual Communications and Image Processing*, Perth, Australia, vol. 4067, pp. 238-249 (Jun. 2000).
Flierl et al., "Generalized B Pictures and the Draft H.264/Avc Video Compression Standard," in *IEEE Transactions on Circuits and Systems for Video Technology*, vol. 13, No. 7, pp. 587-597 (Jul. 2003).
Foos et al., "Jpeg 2000 compression of medical imagery," *Proc. SPIE*, vol. 3980, pp. 85-96 (Feb. 2000).
Garrigues et al., "Atom position coding in a matching pursuit based video coder," *Lecture Notes in Computer Science*, 4 pp. (Sep. 2005).
Gish et al., "Asymptotically efficient quantizing," *IEEE Trans. Inform. Theory*, vol. IT-14, No. 5 (Sep. 1968).
Golner et al., "Region Based Variable Quantization for JPEG Image Compression," *IEEE Symp. on Circuits and Systems*, pp. 604-607 (Aug. 2000).
Golston et al., "Video codecs tutorial: Trade-offs with H.264, VC-1 and other advanced codecs," *Video/Imaging Design Line*, 9 pp. (Mar. 2006).
"H.264 & IPTV Over DSL—Enabling New Telco Revenue Opportunities," *White Paper*, 12 pp. (May 15, 2004).
Hannuksela et al., "Sub-picture: ROI coding and unequal error protection," Proc. 2002 Int'l Conf. on Image Processing, vol. 3, Issue 24-28, pp. 537-540 (Jun. 2002).
"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).
"ISO/IEC 13818-2. Generic coding of moving pictures and associated audio information," MPEG (Moving Pictures Expert Group), International Organization for Standardization, MPEG2 Video, 23 pp. (Dec. 2000).

ISO/IEC, "Information Technology—Coding of Audio-Visual Objects: Visual, ISO/IEC 14496-2, Committee Draft," 330 pp. (Mar. 1998).
ISO/IEC, "14496-2: Information Technology—Coding of Audio-Visual Objects—Part 2: Visual," 724 pp. (Jun. 2004).
ITU-T, "ITU-T Recommendation H.261: Video Codec for Audiovisual Services at $p$x 64 kbits," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Kim et al., "Still image coding based on vector quantization and fractal approximation," *IEEE Transactions on Image Processing*, vol. 5, No. 4, pp. 587-597 (Apr. 1996).
Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).
Lam et al., "A mathematical analysis of the DCT coefficient distributions for images," *IEEE Trans. Image Proc.*, vol. IP-9, No. 10, pp. 1661-1666 (Oct. 2000).
U.S. Appl. No. 10/846,140, filed May 15, 2004, Sullivan.
LeGall, "MPEG: A Video Compression Standard for Multimedia Application," *Communications of the ACM*, vol. 34, No. 4, pp. 47-58 (Apr. 1991).
LeGall, "The MPEG Video Compression Algorithm," *Signal Processing: Image Communication 4*, vol. 4, No. 2, pp. 129-140 (Apr. 1992).
Lei et al., "Rate Adaptation Transcoding for Precoded Video Streams," 13 pp. (month unknown 2000).
Limb, "A Picture-Coding Algorithm for the Merli Scan," *IEEE Transactions on Communications*, pp. 300-305 (Apr. 1973).
Lin et al, "Low-complexity face-assisted coding scheme for low bit rate video telephony," *IEICE Trans. Inf. & Sys.*, vol. E86-D, No. 1, pp. 101-108 (Jan. 2003).
Lin et al, "Low-complexity face-assisted video coding," *Proc. 2000 Int'l Conf. on Image Processing*, vol. 2, pp. 207-210 (Sep. 2000).
Lloyd, "Least squares quantization in PCM," *IEEE Trans. Inform. Theory*, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).
Mallat, "A theory for multiresolution signal decomposition: the wavelet representation," *IEEE Trans. Pattern Anal. and Machine Intell.*, vol. PAMI-11, No. 7, pp. 674-692 (Jul. 1989).
Masala et al., "Perceptually Optimized MPEG Compression of Synthetic Video Sequences," *Proc. ICIP*, pp. I-601-I-604 (Sep. 2005).
Max, "Quantizing for minimum distortion," *IEEE Trans. Inform. Theory*, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," *Proceedings of SPIE*, pp. 207-217 (Jun. 2002).
Mook, "Next-Gen Windows Media Player Leaks to the Web," *BetaNews*, 17 pp. (Jul. 19, 2002) [Downloaded from the World Wide Web on Aug. 8, 2003].
Muller, "Distribution shape of two-dimensional DCT coefficients of natural images," *IEE Electronics Letters*, vol. 29, No. 22 (Oct. 1993).
Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).
Neff et al., "Modulus Quantization for Matching Pursuit Video Coding," *IEEE Transactions on Circuits and Systems for Video Technology*, vol. 10, No. 6, pp. 895-912 (Sep. 2000).
Nguyen et al., "Set Theoretic Compression with an Application to Image Coding," *IEEE Transactions on Image Processing*, vol. 7, No. 7, pp. 1051-1056 (Jul. 1998).
Park et al., "A post processing method for reducing quantization effects in low bit-rate moving picture coding," *IEEE Trans. Circuits Syst. Video Technology*, vol. 9, pp. 161-171 (Feb. 1999).
Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).
Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).
Reininger et al., "Distribution of two-dimensional DCT coefficients for images," *IEEE Trans. On Commun.*, vol. COM-31, No. 6, pp. 835-839 (Jun. 1983).
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Schallauer et al., "PRESTO—Preservation Technologies for European Broadcast Archives, D5.4—High Quality Compression for Film and Video," 80 pp. (Sep. 18, 2002).
Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).
Shen et al., "Rate-Distortion Optimization for Fast Hierarchical B-Picture Transcoding," *IEEE*, pp. 5279-5282 (May 2006).
Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).
Sony Electronics Inc., "Sony Vizaro DVD Encoder System DVA-V700," 4 pp. (Apr. 2001).
Sullivan, "Efficient scalar quantization of exponential and Laplacian random variables," *IEEE Trans. Inform. Theory*, vol. IT-42, No. 5, pp. 1365-1374 (Sep. 1996).
Sullivan et al., "Rate-Distortion Optimization for Video Compression," *IEEE Signal Processing Magazine*, pp. 74-90 (Nov. 1998).
Sullivan et al., "The H.264/AVC Advanced Video Coding Standard: Overview and Introduction to the Fidelity Range Extensions," 21 pp. (Aug. 2004).
Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).
Tsang et al., "Fuzzy Based Rate Control for Real-Time MPEG Video," *IEEE Transactions on Fuzzy Systems*, pp. 504-516 (Nov. 1998).
Wang, et al., "A Framework for Adaptive Scalable Video Coding Using Wyner-Ziv Techniques," *EURASIP Journal on Applied Signal Processing*, pp. 1-18 (month unknown, 2006).
Wien, "Variable Block-Size Transforms for Hybrid Video Coding," Dissertation, 182 pp. (Feb. 2004).
Wu et al., "Context-Based, Adaptive, Lossless Image Coding," *IEEE Trans. Communications*, vol. 45, pp. 437-444 (Apr. 1997).
Wu et al., "Joint Estimation of Forward and Backward Motion Vectors for Interpolative Prediction of Video," *IEEE Transactions on Image Processing*, vol. 3, No. 5, pp. 684-687 (Sep. 1994).
Xiong et al., "Wavelet Packet Image Coding Using Space-Frequency Quantization," *IEEE Transactions on Image Processing*, vol. 7, No. 6, pp. 892-898 (Jun. 1998).
Yang et al., "Rate Control for Videophone Using Local Perceptual Cues," *IEEE Transactions on Circuits and Systems for Video Tech.*, vol. 15, No. 4, pp. 496-507 (Apr. 2005).
Yuen et al., "A survey of hybrid MC/DPCM/DCT video coding distortions," *Signal Processing*, vol. 70, pp. 247-278 (Nov. 1998).
Zaid et al., "Wavelet Image Coding with Adaptive Thresholding," 4 pp. (Jul. 2002).
Zhang et al., "Adaptive Field/Frame Selection for High Compression Coding," *SPIE Conf. on Image and Video Communications and Processing*, 13 pp. (Jan. 2003).
Chang et al., "Adaptive Wavelet Thresholding for Image Denoising and Compression," *IEEE Trans on Image Processing*, vol. 9, No. 9, pp. 1532-1546 (Sep. 2000).
Gavrilescu et al., "Embedded Multiple Description Scalar Quantizers," *IEE Electronics Letters*, vol. 39, No. 13, 12 pp. (Jun. 2003).
Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).
Watson et al., "Visibility of Wavelet Quantization Noise," *IEEE Trans. on Image Processing*, vol. 6, No. 8, pp. 1164-1175 (Aug. 1997).
Joshi et al., "Comparison of generalized Gaussian and Laplacian modeling in DCT image coding," *IEEE Signal Proc. Letters*, vol. SPL-2, No. 5, pp. 81-82 (May 1995).
Donoho et al., "Data compression and Harmonic Analysis," *IEEE transaction on information theory*, vol. 44, No. 6, pp. 2435-2476 (Oct. 1998).
ISO/IEC, "Study text (version 3) of ISO/IEC 14496-10:2005/FPDAM3 Scalable Video Coding (in integrated form with ISO/IEC 14996-10)," ISO/IEC JTC 1/SC29/WG 11 N8962, pp. 59-103, 175-196, 404-423, 453-470 (Apr. 2007).
ITU-T, "CCITT Recommendation T.81: Information Technology—Digital Compression and Coding of Continuous-Tone Still Images—Requirements and Guidelines," 190 pp. (Sep. 1992).
ITU-T, "ITU-T Recommendation T.84: Terminals for Telematic Services—Information Technology—Digital Compression and Coding of Continuous-Tone Still Images: Extensions," 84 pp. (Jul. 1996).
ITU-T, "ITU-T Recommendation T.801: JPEG 2000 image coding system: Extensions," 334 pp. (Aug. 2002).
Man et al., "Three-Dimensional Subband Coding Techniques for Wireless Video Communications," *IEEE Trans. on Circuits and Systems for Video Technology*, vol. 12, No. 6, pp. 386-397 (Jun. 2002).
Marcellin et al., "An overview of quantization in JPEG 2000," *Signal Processing: Image Communication*, vol. 17, pp. 73-84 (Jan. 2002).
Srinivasan et al., "HD Photo: A new image coding technology for digital photography," *Proc. of SPIE*, vol. 6696, 19 pp. (Jan. 2007).
Tong, "A perceptually adaptive JPEG coder," Thesis, University of Toronto, 124 pp. (1997).
Watson, "Perceptual Optimization of DCT Color Quantization Matrices," *IEEE Conf. on Image Processing*, pp. 100-104 (Nov. 1994).
Yoo et al., "Adaptive Quantization of Image Subbands with Efficient Overhead Rate Selection," *IEEE Conf. on Image Processing*, pp. 361-364 (Sep. 1996).
Calderbank et al., "Wavelet transforms that map integers to integers," Mathematics Subject Classification, Aug. 1996, 39 pages.
Chai et al., "Face Segmentation Using Skin-Color Map in Videophone Applications," IEEE Transaction on Circuits and Systems for Video Technology, vol. 9, No. 4, pp. 551-564, Jun. 1999.
Correia et al., "Classification of Video Segmentation Application Scenarios," IEEE Transactions on Circuits and Systems for Video Technology, vol. 14, No. 5, pp. 735-741, May 2004.
Daly et al., "Face-Based Visually-Optimized Image Sequence Coding," 1998 International Conference on Image Processing, vol. 3, pp. 443-447, Oct. 1998.
Eleftheriadis et al., "Dynamic Rate Shaping of Compressed Digital Video," IEEE Transactions on Multimedia, vol. 8, No. 2, Apr. 2006, pp. 297-314.
Lee et al., "Spatio-Temporal Model-Assisted Compatible Coding for Low and Very Low Bitrate Videotelephony," 3rd IEEE International Conference on Image Processing, 4 pages, Sep. 1996.
Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.
Richardson, H.264 and MPEG-4 Video Compression, pp. 50-56 and 187-196 (2003).

\* cited by examiner

SOFTWARE 580 IMPLEMENTING
VIDEO ENCODER OR DECODER

ADAPTIVE VIDEO ENCODING USING A PERCEPTUAL MODEL

FIELD

The described technology relates to video compression, and more specifically, to adaptive video encoding using a perceptual model.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, and the compressed frame are typically called predicted frames, P-frames, or B-frames.

For example, Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

Intraframe Compression in WMV8

FIG. 1 illustrates prior art block-based intraframe compression 100 of a block 105 of pixels in a key frame in the WMV8 encoder. A block is a set of pixels, for example, an 8×8 arrangement of samples for pixels (just pixels, for short). The WMV8 encoder splits a key video frame into 8×8 blocks and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. For example, the encoder applies a uniform, scalar quantization step size to each coefficient. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding column or row of the neighboring 8×8 block. FIG. 1 shows the left column 127 of AC coefficients encoded as a differential 147 from the left column 137 of the neighboring (to the left) block 135. The differential coding increases the chance that the differential coefficients have zero values. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame 210 and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblock, a motion estimation process is performed. The motion estimation approximates the motion of the macroblock of pixels relative to a reference frame, for example, a previously coded, preceding frame. In FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. Various prior art motion estimation techniques are described in U.S. Pat. No. 6,418, 166. After the encoder finds a good matching macroblock, the encoder outputs information specifying the motion vector (entropy coded) for the matching macroblock so the decoder can find the matching macroblock during decoding. When decoding the predicted frame 210 with motion compensation, a decoder uses the motion vector to compute a prediction macroblock for the macroblock 215 using information from the reference frame 230. The prediction for the macroblock 215 is rarely perfect, so the encoder usually encodes 8×8 blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The quantization step size is adjustable. Quantization results in loss of precision, but usually not complete loss of the information for the coefficients.

The encoder then prepares the 8×8 block 355 of quantized DCT coefficients for entropy encoding. The encoder scans 360 the 8×8 block 355 into a one-dimensional array 365 with 64 elements, such that coefficients are generally ordered from lowest frequency to highest frequency, which typically creates long runs of zero values.

The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. Due to the quantization of the DCT coefficients, the reconstructed block 475 is not identical to the corresponding original block. The compression is lossy.

In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

Standards for Video Compression and Decompression

Aside from WMV8, several other versions of Windows Media Video use video compression and decompression, including Windows Media Video 9. Aside from these, several international standards relate to video compression and decompression. These standards include the Motion Picture Experts Group ["MPEG"] 1, 2, and 4 standards and the H.261, H.262, H.263, and H.264 standards from the International Telecommunication Union ["ITU"]. Like WMV8, encoders according to these products and standards use a combination of intraframe and interframe compression.

Differential Quantization

In general, differential quantization is a technique in which the amount of quantization applied to various macroblocks or blocks within a single video frame can vary. Differential quantization has been adopted or used in various standards. One benefit of differential quantization is to control bit rate at finer resolution to meet hardware requirements. One common problem that occurs when it is used, however, is that the visual quality is compromised, especially when it is used in low bit rate encoding. For example, signaling quantization parameters individually per each block in a frame of video can consume a significant proportion of bits in the compressed bitstream, especially at low bit rates, which bits could otherwise be used to encode better quality video in other ways.

U.S. Patent Application Publication No. 20050013500 describes various differential quantization techniques.

Adaptive Quantization

U.S. Patent Application Publication No. 20050036699 describes various adaptive quantization techniques. With adaptive multiple quantization, a video or other digital media codec can adaptively select among multiple quantizers to apply to transform coefficients based on content or bit rate constraints, so as to improve quality through rate-distortion optimization. The switch in quantizers can be signaled at the sequence level or frame level of the bitstream syntax, or can be implicitly specified in the syntax.

Rate Control

U.S. Patent Application Publication No. 20020186890 describes various rate and quality control techniques in which median filtering is adjusted. Based upon the buffer level, a video encoder changes the median filter kernel applied to video information. If the buffer starts to get too full, the video encoder increases the size of the kernel, which tends to smooth the video information, introduce slight blurriness, and deplete the buffer.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

The described technologies provide methods and systems for adaptive video encoding using a perceptual model. The following summary describes a few of the features described in the detailed description, but is not intended to summarize the technology.

In one example, for each of plural blocks of video data, a computer method classifies blocks of video data according to content of the blocks, and adaptively encodes the blocks based at least in part upon the block classification. In one such example, and depending at least in part on the block classification, adaptive encoding includes either adaptive median filtering, selectively dropping a last non-zero transform coefficient, adaptively re-sizing the dead zone, or adjusting a quantization step size.

In another example, blocks of video data are classified based in part on a block gradient which is determined by plural pixel gradients. In one example, a block classification such as smooth, texture, or edge is based at least in part on a block value. In one such example, a block value is determined based on an average of pixel gradients, in another example, the block value is determined based on a median of pixel gradients.

In certain examples, a pixel gradient can be quantified as a sum of differences, where the sum of differences is determined based upon both luminance and or chrominance samples. In one such example, luminance samples are downsampled for the block before the sum of differences is determined.

In certain examples, adaptive median filtering is performed on a motion compensation prediction residual and includes changing filter dimensions depending on the block classification.

In another example, selective dropping of a last non-zero coefficient further depends at least in part on a number of consecutive zero coefficients preceding the last non-zero coefficient in a zig-zag scan. In other examples, a quantization step size adjustment includes applying differential quantization depending at least in part on the block classification.

An example video encoder includes a region detector module for classifying blocks of video frames, an adaptive filter module for median filtering motion compensation error data based upon block classifications, and an adaptive quantization module for differentially quantizing the motion compensation error data based upon the block classifications.

In another example, a video encoder includes an adaptive quantization module that selectively drops isolated last non-zero transform coefficients based on the block classifications, and/or changes quantization dead-zones based on the block classifications.

Additional features and advantages will be made apparent from the following detailed description, which proceeds with reference to the accompanying drawings.

DETAILED DESCRIPTION

Figure 1:
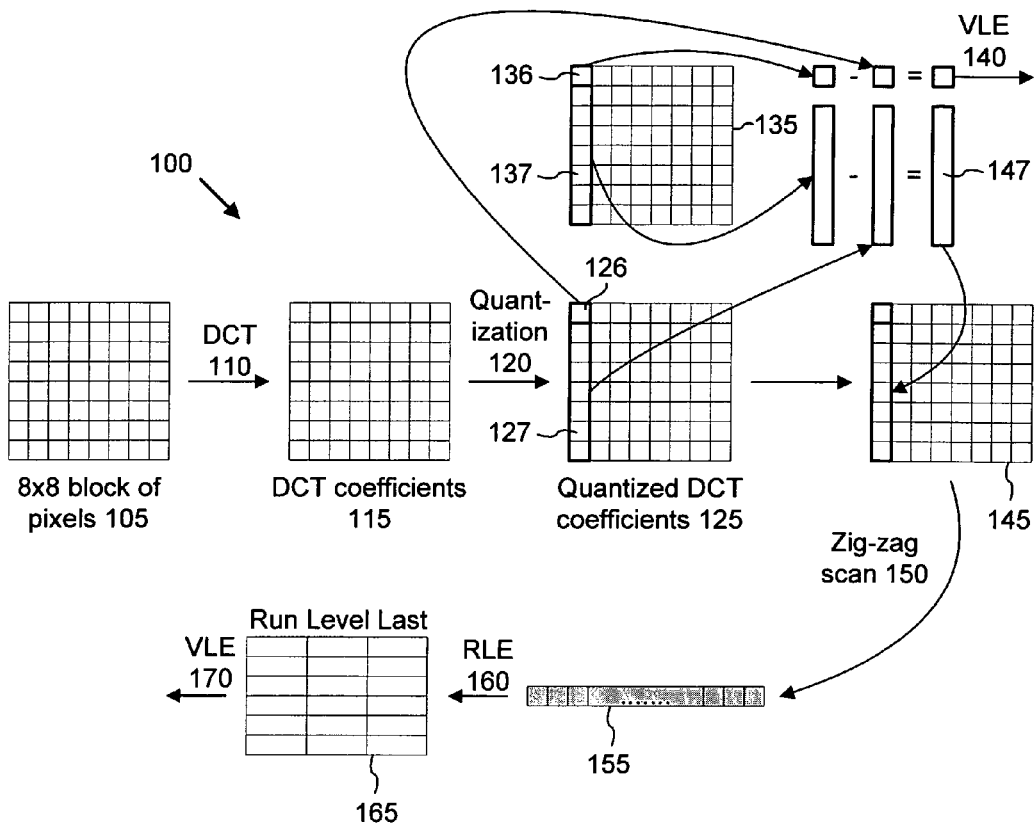
FIG. 1 is a diagram showing block-based intraframe compression of an 8×8 block of pixels according to the prior art.
Figure 2:
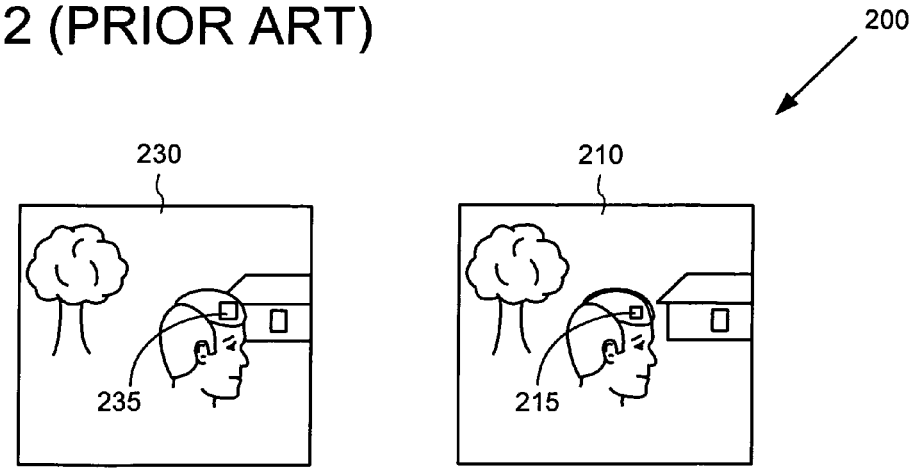
FIG. 2 is a diagram showing motion estimation in a video encoder according to the prior art.
Figure 3:
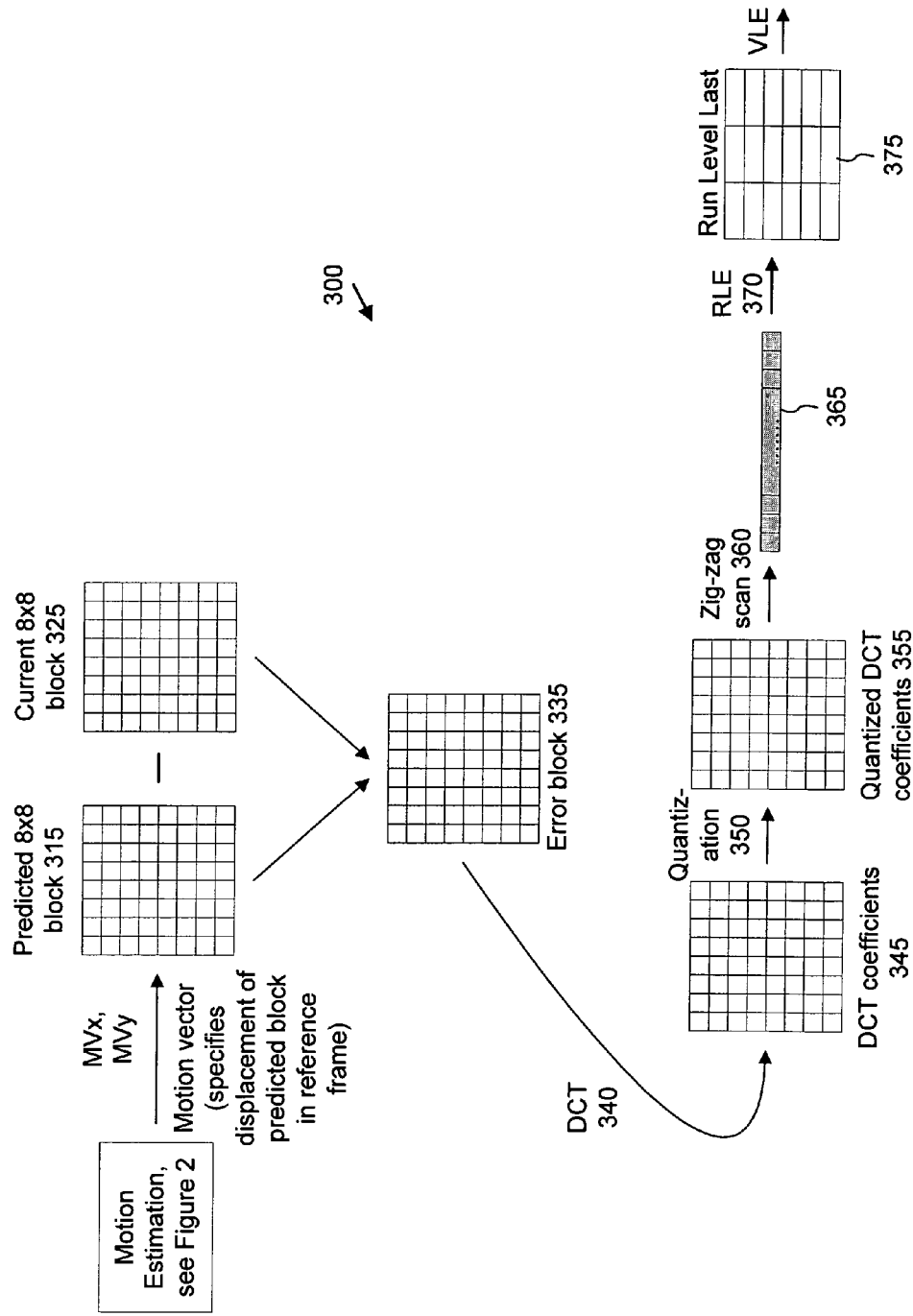
FIG. 3 is a diagram showing block-based interframe compression for an 8×8 block of prediction residuals in a video encoder according to the prior art.
Figure 4:
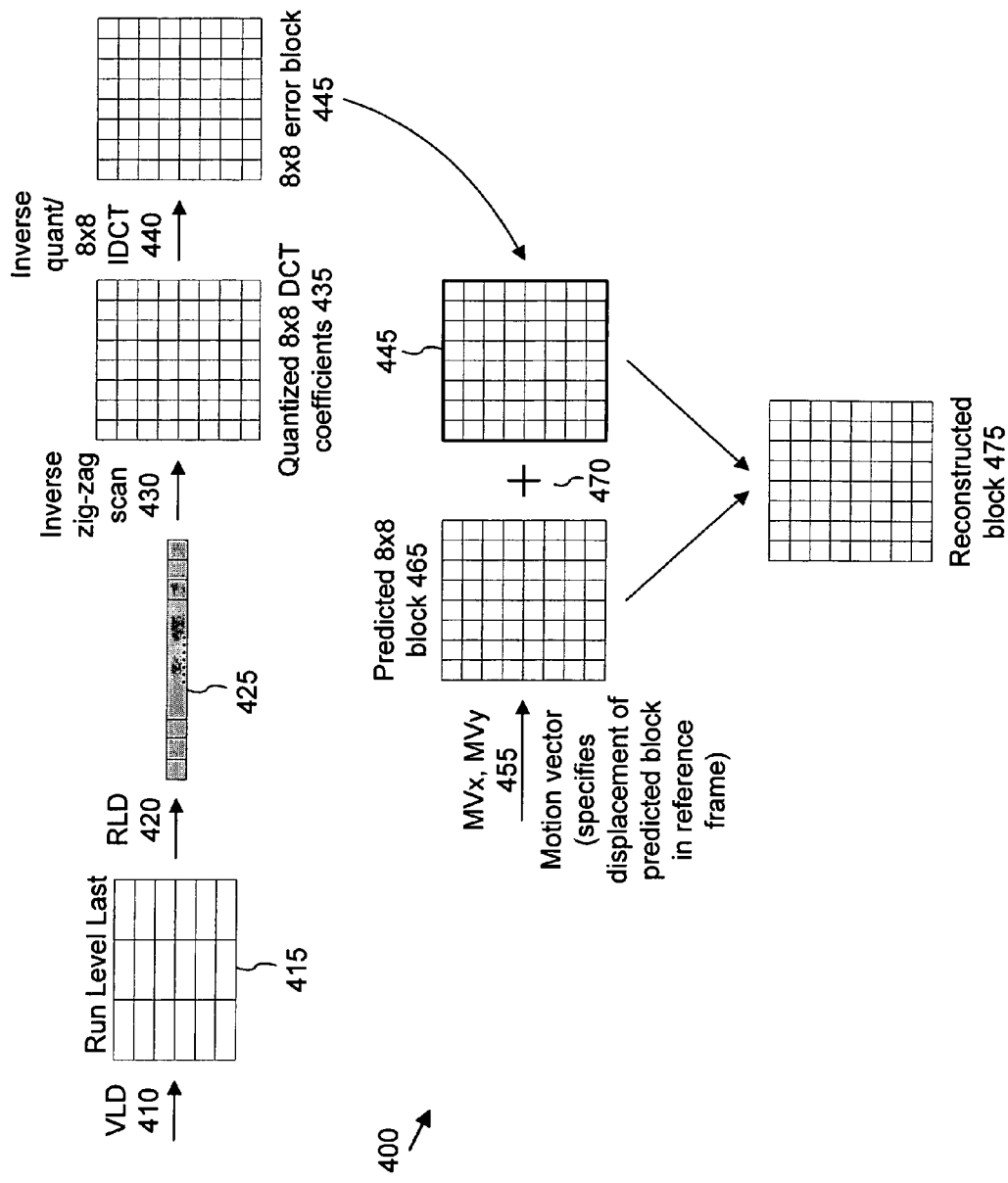
FIG. 4 is a diagram showing block-based interframe decompression for an 8×8 block of prediction residuals in a video decoder according to the prior art.
Figure 5:
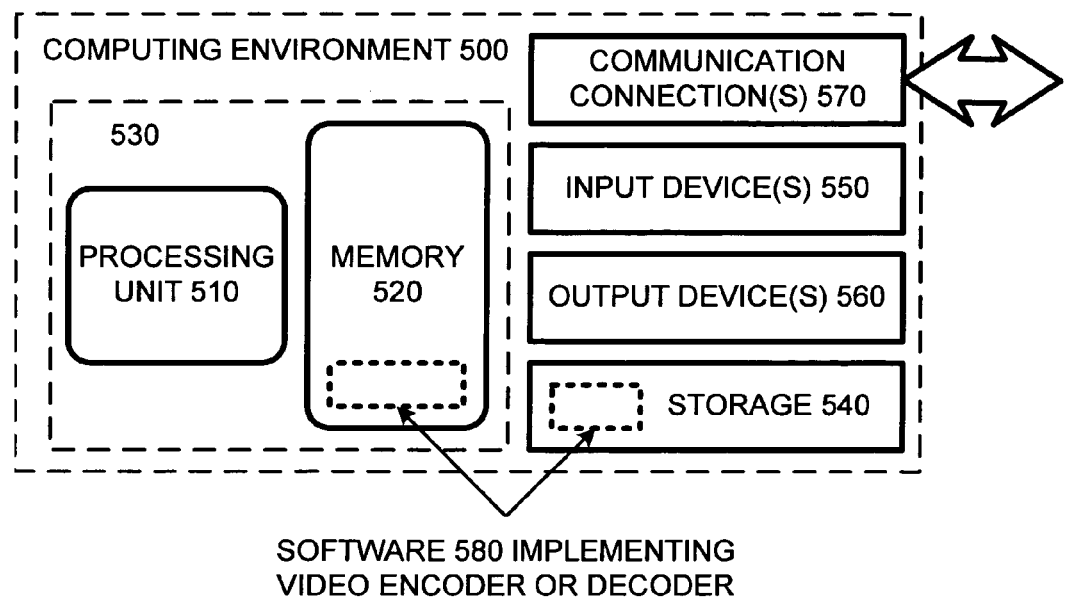
FIG. 5 is a block diagram of a suitable computing environment in which several described embodiments may be implemented.
Figure 6:
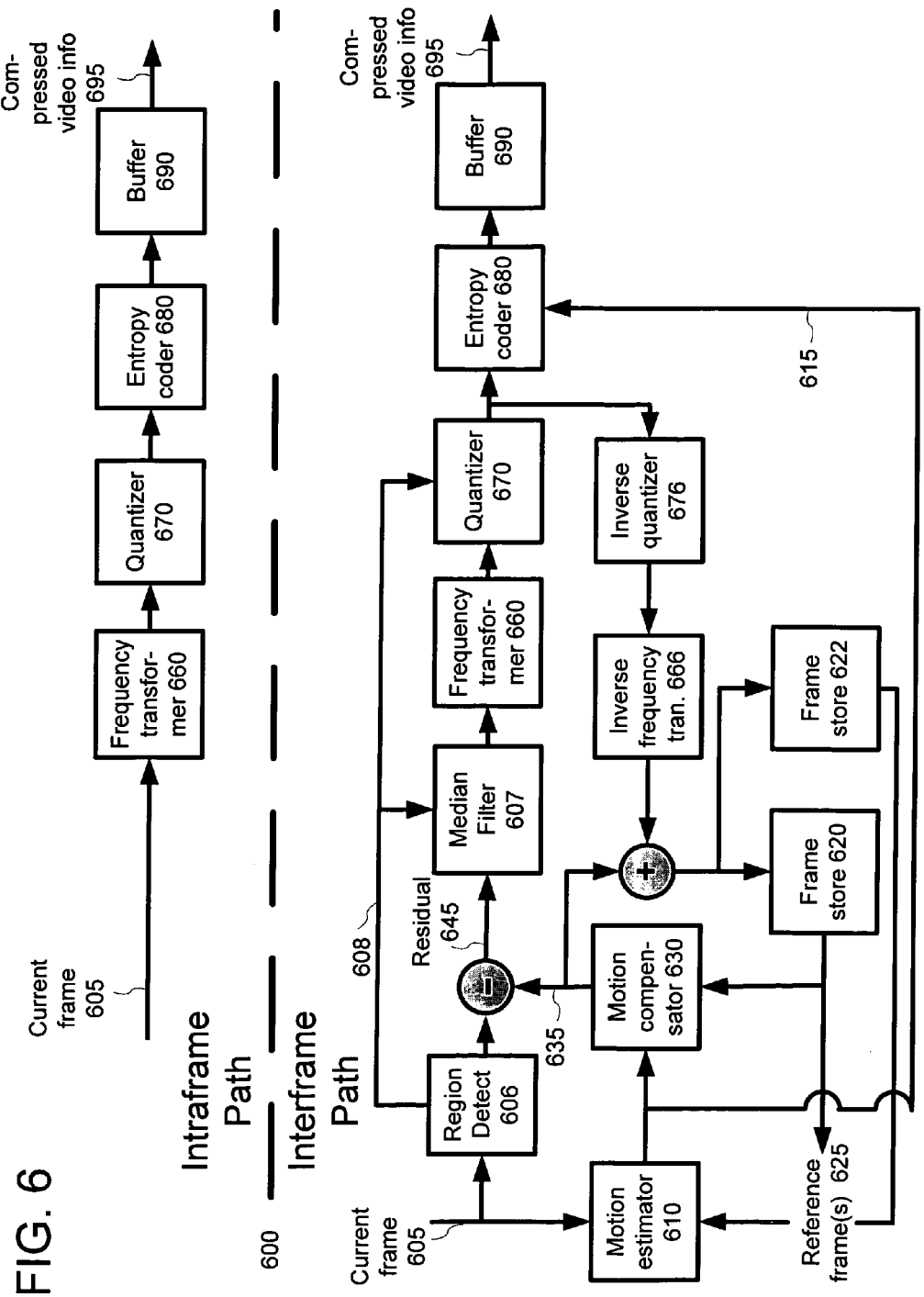
FIG. 6 is a block diagram of a generalized video encoder system used in several described embodiments.
Figure 7:
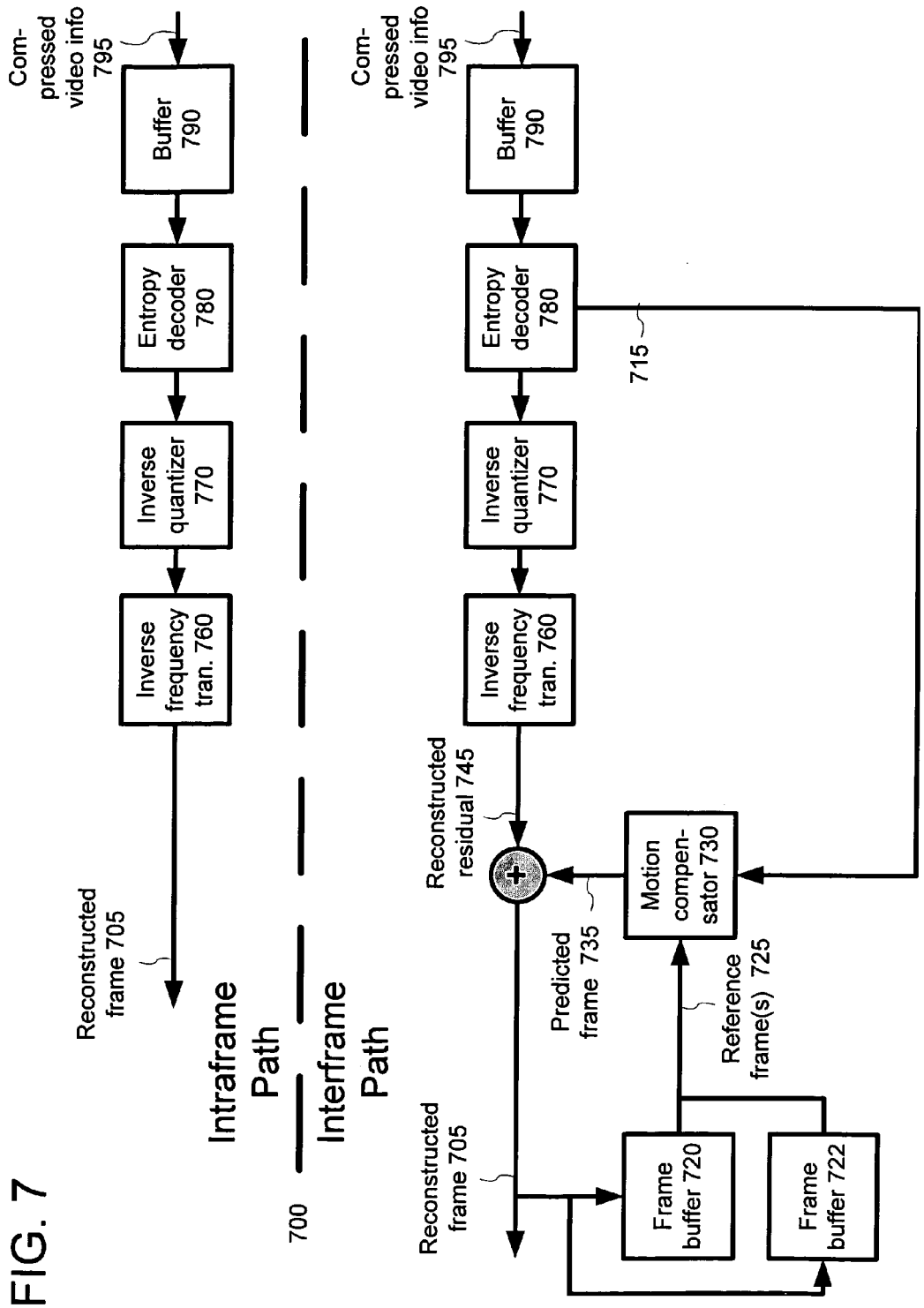
FIG. 7 is a block diagram of a generalized video decoder system used in several described embodiments.

For purposes of illustration, the various aspects of the innovations described herein are incorporated into or used by embodiments of a video encoder and decoder (together, "codec") illustrated in FIGS. 6-7. In alternative embodiments, the innovations described herein can be implemented independently or in combination in the context of other digital signal compression systems, and implementations may provide adaptive video encoding using a perceptual model in compliance with any of various video codec standards. In general, the innovations described herein can be implemented in a computing device, such as illustrated in FIG. 5. Additionally, a video encoder incorporating the described innovations or a decoder processing output created utilizing the described innovations can be implemented in various combinations of software and/or in dedicated or programmable digital signal processing hardware in other digital signal processing devices.

Example Computing Environment

FIG. 5 illustrates a generalized example of a suitable computing environment 500 in which several of the described embodiments may be implemented. The computing environment 500 is not intended to suggest any limitation as to scope of use or functionality, as the techniques and tools may be implemented in diverse general-purpose or special-purpose computing environments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. The memory 520 stores software 580 implementing a video encoder (with adaptive encoding options according to a perceptual model) or decoder.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, DVDs, or any other medium which can be used to store information and which can be accessed within the computing environment 500. The storage 540 stores instructions for the software 580 implementing the video encoder or decoder.

The input device(s) 550 may be a touch input device such as a keyboard, mouse, pen, or trackball, a voice input device, a scanning device, or another device that provides input to the computing environment 500. For audio or video encoding, the input device(s) 550 may be a sound card, video card, TV tuner card, or similar device that accepts audio or video input in analog or digital form, or a CD-ROM or CD-RW that reads audio or video samples into the computing environment 500. The output device(s) 560 may be a display, printer, speaker, CD-writer, or another device that provides output from the computing environment 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 500, computer-readable media include memory 520, storage 540, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types.

The functionality of the program modules may be combined or split between program modules as desired in various embodiments. Computer-executable instructions for program modules may be executed within a local or distributed computing environment.

For the sake of presentation, the detailed description uses terms like "indicate," "choose," "obtain," and "apply" to describe computer operations in a computing environment. These terms are high-level abstractions for operations performed by a computer, and should not be confused with acts performed by a human being. The actual computer operations corresponding to these terms vary depending on implementation.

Example Video Encoder and Decoder

FIG. 6 is a block diagram of a generalized video encoder 600 and FIG. 7 is a block diagram of a generalized video decoder 700.

The relationships shown between modules within the encoder and decoder indicate the main flow of information in the encoder and decoder; other relationships are not shown for the sake of simplicity. In particular, unless indicated otherwise, FIGS. 6 and 7 generally do not show side information indicating the encoder settings, modes, tables, etc. used for a video sequence, frame, macroblock, block, etc. Such side information is sent in the output bit stream, typically after entropy encoding of the side information. The format of the output bit stream can be a Windows Media Video format, VC-1 format, H.264/AVC format, or another format.

The encoder 600 and decoder 700 are block-based and use a 4:2:0 macroblock format. Each macroblock includes four 8×8 luminance blocks (at times treated as one 16×16 macroblock) and two 8×8 chrominance blocks. The encoder 600 and decoder 700 also can use a 4:1:1 macroblock format with each macroblock including four 8×8 luminance blocks and four 4×8 chrominance blocks. FIGS. 6 and 7 show processing of video frames. More generally, the techniques described herein are applicable to video pictures, including progressive frames, interlaced fields, or frames that include a mix of progressive and interlaced content. Alternatively, the encoder 600 and decoder 700 are object-based, use a different macroblock or block format, or perform operations on sets of pixels of different size or configuration.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

FIG. 6 is a block diagram of a general video encoder system 600. The encoder system 600 receives a sequence of video frames including a current frame 605, and produces compressed video information 695 as output. Particular embodiments of video encoders typically use a variation or supplemented version of the generalized encoder 600.

The encoder system 600 compresses predicted frames and key frames. For the sake of presentation, FIG. 6 shows a path for key frames through the encoder system 600 and a path for predicted frames. Many of the components of the encoder system 600 are used for compressing both key frames and predicted frames. The exact operations performed by those components can vary depending on the type of information being compressed.

A current frame 605 is evaluated by a region detector 606 in order to detect or classify regions of the frame according to content in those regions. For example, the region detector 606 may characterize macroblocks, blocks, or other sets of pixels of the current frame 605 as smooth, texture, or edge regions depending on their content. These characterizations are used to adapt how the regions are encoded. For example, macroblocks or blocks are evaluated to determine whether they are perceptually (1) smooth, (2) textured, or (3) represent edge or transition regions. Alternatively, the region detector 606 used other and/or additional characterizations according to the same perceptual criteria or different perceptual criteria. Moreover, although FIG. 6 shows the region detector 606 only in the interframe path, the encoder system 600 may also include the region detector 606 in the intraframe path.

A predicted frame (also called P-frame, B-frame, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames.

If the current frame 605 is a forward-predicted frame, a motion estimator 610 estimates motion of macroblocks or other sets of pixels of the current frame 605 with respect to a reference frame, which is the reconstructed previous frame 625 buffered in a frame store (e.g., frame store 620). If the current frame 605 is a bi-directionally-predicted frame (a B-frame), a motion estimator 610 estimates motion in the current frame 605 with respect to two reconstructed reference frames. Typically, a motion estimator estimates motion in a B-frame with respect to a temporally previous reference frame and a temporally future reference frame. Accordingly, the encoder system 600 can comprise separate stores 620 and 622 for backward and forward reference frames. Various techniques are known for providing motion estimation.

The motion estimator 610 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 610 outputs as side information motion information 615 such as motion vectors. A motion compensator 630 applies the motion information 615 to the reconstructed frame(s) 625 to form a motion-compensated current frame 635. The prediction is rarely perfect, however, and the difference between the motion-compensated current frame 635 and the original current frame 605 is the prediction residual 645.

In FIG. 6, an adaptive median filter 607 is applied to the prediction residual 645. Optionally, the adaptive median filter 607 utilizes region characterization 608 information generated by the region detector 606 to determine a median filter configuration (e.g., kernel shape or dimensions). For example, for a texture region, a strong, 5×5 median filter is used to filter the prediction residual. A weak, 3×1 median filter is used to filter the prediction residual for a smooth region or an edge region. Optionally, a user is provided the opportunity to vary the median filter. For example, a user may select stronger median filtering. In such an example, a strong, 5×5 median filter is used for texture regions while a weak, 3×3 filter is used for smooth or edge regions. A stronger filter is applied to texture regions because, compared to smooth regions, human perception is less sensitive to distortion in the texture regions. This facilitates encoding the texture regions with fewer bits at a particular perceptual quality (compared to the amount of bits needed to encode smooth regions at the same perceptual quality). Further variations in median filters are contemplated for adaptive encoding as computing resources evolve.

A frequency transformer 660 converts the spatial domain video information into frequency domain (i.e., spectral) data. For block-based video frames, the frequency transformer 660 applies a discrete cosine transform ["DCT"] or variant of DCT to blocks of the pixel data or prediction residual data, producing blocks of DCT coefficients. Alternatively, the frequency transformer 660 applies another conventional frequency transform such as a Fourier transform or uses wavelet or subband analysis. In some embodiments, the frequency transformer 660 applies an 8×8, 8×4, 4×8, or other size frequency transforms (e.g., DCT) to prediction residuals for predicted frames.

A quantizer 670 then quantizes the blocks of spectral data coefficients. Optionally, the quantizer 670 is an adaptive quantizer that adaptively quantizes blocks based on a block characterization or value information 608 generated by the region detector 606. If an adaptive quantizer is utilized, one or more adaptive quantization mechanisms are employed based on the information 608 generated by the region detector 606. In one example, an isolated last non-zero transform coefficient may be dropped (reduced to zero), for example, in texture regions. As another example, an adaptive adjustment of a dead-zone size for quantization is provided during transform coefficient quantization in texture regions. As still another example, a differential quantization metric is provided during transform coefficient quantization, for example, to categorically adjust quantization in smooth vs. non-smooth regions.

When a reconstructed current frame is needed for subsequent motion estimation/compensation, an inverse quantizer 676 performs inverse quantization on the quantized spectral data coefficients. An inverse frequency transformer 666 then performs the inverse of the operations of the frequency transformer 660, producing a reconstructed prediction residual (for a predicted frame) or a reconstructed key frame.

If the current frame 605 was a key frame, the reconstructed key frame is taken as the reconstructed current frame (not shown). If the current frame 605 was a predicted frame, the reconstructed prediction residual is added to the motion-compensated current frame 635 to form the reconstructed current frame. If desirable, a frame store (e.g., frame store 620) buffers the reconstructed current frame for use in predicting another frame. In some embodiments, the encoder applies a deblocking filter to the reconstructed frame to adaptively smooth discontinuities in the blocks of the frame.

The entropy coder 680 compresses the output of the quantizer 670 as well as certain side information (e.g., motion information 615 and/or quantization step sizes). Typical entropy coding techniques include arithmetic coding, differential coding, Huffman coding, run length coding, LZ coding, dictionary coding, and combinations of the above. The entropy coder 680 typically uses different coding techniques for different kinds of information (e.g., DC coefficients, AC coefficients, different kinds of side information), and can choose from among multiple code tables within a particular coding technique.

The entropy coder 680 puts compressed video information 695 in the buffer 690. A buffer level indicator is fed back to bit rate adaptive modules.

The compressed video information 695 is depleted from the buffer 690 at a constant or relatively constant bit rate and stored for subsequent streaming at that bit rate. Therefore, the level of the buffer 690 is primarily a function of the entropy of the filtered, quantized video information, which affects the efficiency of the entropy coding. Alternatively, the encoder system 600 streams compressed video information immediately following compression, and the level of the buffer 690 also depends on the rate at which information is depleted from the buffer 690 for transmission.

Before or after the buffer 690, the compressed video information 695 can be channel coded for transmission over the network. The channel coding can apply error detection and correction data to the compressed video information 695.

FIG. 7 is a block diagram of a general video decoder system 700. The decoder system 700 receives information 795 for a compressed sequence of video frames and produces output including a reconstructed frame 705. Particular embodiments of video decoders typically use a variation or supplemented version of the generalized decoder 700.

The decoder system 700 decompresses predicted frames and key frames. For the sake of presentation, FIG. 7 shows a path for key frames through the decoder system 700 and a path for predicted frames. Many of the components of the decoder system 700 are used for decompressing both key frames and predicted frames. The exact operations performed by those components can vary depending on the type of information being decompressed.

A buffer 790 receives the information 795 for the compressed video sequence and makes the received information available to the entropy decoder 780. The buffer 790 typically receives the information at a rate that is fairly constant over time, and includes a jitter buffer to smooth short-term variations in bandwidth or transmission. The buffer 790 can include a playback buffer and other buffers as well. Alternatively, the buffer 790 receives information at a varying rate. Before or after the buffer 790, the compressed video information can be channel decoded and processed for error detection and correction.

The entropy decoder 780 entropy decodes entropy-coded quantized data as well as entropy-coded side information (e.g., motion information 715 and/or quantization step sizes), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 780 frequently uses different decoding techniques for different kinds of information (e.g., DC coefficients, AC coefficients, different kinds of side information), and can choose from among multiple code tables within a particular decoding technique.

A motion compensator 730 applies motion information 715 to one or more reference frames 725 to form a prediction 735 of the frame 705 being reconstructed. For example, the motion compensator 730 uses a macroblock motion vector to find a macroblock in a reference frame 725. A frame buffer (e.g., frame buffer 720) stores previously reconstructed frames for use as reference frames. Typically, B-frames have more than one reference frame (e.g., a temporally previous reference frame and a temporally future reference frame). Accordingly, the decoder system 700 can comprise separate frame buffers 720 and 722 for backward and forward reference frames.

The motion compensator 730 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 700 also reconstructs prediction residuals.

When the decoder needs a reconstructed frame for subsequent motion compensation, a frame buffer (e.g., frame buffer 720) buffers the reconstructed frame for use in predicting another frame. In some embodiments, the decoder applies a deblocking filter to the reconstructed frame to adaptively smooth discontinuities in the blocks of the frame.

An inverse quantizer 770 inverse quantizes entropy-decoded data. In general, the inverse quantizer applies uniform, scalar inverse quantization to the entropy-decoded data with a step-size that varies on a frame-by-frame basis or other basis, where the quantization step size information is signaled in the bitstream.

An inverse frequency transformer 760 converts the quantized, frequency domain data into spatial domain video information. For block-based video frames, the inverse frequency transformer 760 applies an inverse DCT ["IDCT"] or variant of IDCT to blocks of the DCT coefficients, producing pixel data or prediction residual data for key frames or predicted frames, respectively. Alternatively, the frequency transformer 760 applies another conventional inverse frequency transform such as a Fourier transform or uses wavelet or subband synthesis. In some embodiments, the inverse frequency transformer 760 applies an 8×8, 8×4, 4×8, or other size inverse frequency transforms (e.g., IDCT) to prediction residuals for predicted frames.

Example Perceptual Model Overview

Perceptual importance of a local region within a video frame changes spatially due to variance of detail complexity over the frame. Human eyes are more sensitive to distortions in smooth regions and edge regions (e.g., object boundaries) in video frames than to distortions in texture regions. Existing video codecs fail to adequately exploit this aspect of the human perception. Using the described techniques, smooth regions and edge regions can be coded at higher quality for a given bit rate by allocating more bits (introducing less distortion) to the smooth regions and edge regions and allocating fewer bits (reducing quality, introducing more distortion) to texture regions. One goal is to improve the overall perceptual quality of the coded video at the same bit rate compared to the previous codec. Various video codec features are described that adaptively allocate bits across blocks or macroblocks of a video frame according to their perceptual characterization, thereby allocating bits differentially buy providing more uniform perceptual quality of the coded video. Often, it is desirable to improve the perceived quality at the same bitrate compared with existing codecs. At other times, it is desirable to maintain a present quality at a reduced bitrate. Various aspects of these features are encoder improvements that may not require any change in the bitstream. The provided features are applicable to both the current encoder profiles (VC-1 and Microsoft Research video encoders) as well as previous profiles (WMV Advanced, WMV3, etc.).

Various features are discussed that may be used in adaptive encoding that employs a perceptual model for video codec. Such features are generally described as (1) detection of different regions (e.g., smooth, edge, texture, etc.), (2) adaptive median filtering, (3) adaptive isolated transform coefficient dropping, (4) adaptive dead zone sizing during quantization, and (5) adaptive differential quantization.

Methods and systems are described for detecting or characterizing different regions of a video frame. Using this characterization information, the video encoding is adapted. For example, more bits are spent on smooth regions and edge regions, while fewer bits are spent on texture regions. These distinctions allow controlling perceivable distortion—when distortion must be introduced to lower bit rate, more distortion is added where it is less easily perceived and less distortion is added where it is more easily perceived.

Improved features include fast detection of different region types using a gradient comparison. For example, variations between adjacent pixels in a block are determined by comparing luminance and/or chrominance sample values. Determined differences between adjacent pixels are used to determine the extent of intensity variance within a block, macroblock, or other video frame region (hereafter "block"). Various metrics can be used to determine the intensity variance between pixel data within a block in order to determine how a human would perceive the block, for example, as smooth or textured.

A median intensity variance can be computed for a block in order to characterize the block. For example, a histogram can be used to determine a median variance for a block. Characterized blocks can be labeled, for example, as smooth, edge, or texture. Alternatively, other and/or additional labels are used. A median variance can also be used as input to a more precise function, with or without requiring labels, where the more precise function provides finer grained control encoding adaptation based on a determined block median.

One or more of the encoding variations are provided based on block characterization. The variations may be used together or separately, and they may be used in combination with other and/or additional encoding variations. In a first variation, an adaptive median filtering is provided based on block characterization. For example, increased median filtering is provided for texture regions. In a second variation, an isolated last non-zero transform coefficient may be dropped, for example, in texture regions. In a third variation, an adaptive adjustment of a dead zone is provided during transform coefficient quantization if desirable in texture regions. In a fourth variation, a differential quantization metric is applied during transform coefficient quantization, for example, depending on whether a region is smooth or non-smooth.

Optionally, values or distinctions used to characterize blocks or to alter various aspects of adaptive encoding may depend on one or more user settings. For example, a user selects an encoding scenario, wizard profile, or other high-level description of an encoding path, and values associated with the scenario/profile/description are set for one or more of the region detection, adaptive median filtering, coefficient dropping conditions, dead zone variance, or adaptive differential quantization. Or, the value for one or more of these options is directly set by a user through a user interface. Alternatively, one or more of these options has a value set when an encoder is installed in a computer system or device, depending on the system/device profile. In another example, one or more of these options is set adaptively by the encoder based on how much computational power is available.

Various aspects of these features are described throughout this disclosure. However, neither the titles of the features, nor the placement within paragraphs of the description of various aspects of features, are meant to limit how various aspects are used or combined with aspects of other features. After reading this disclosure, one of ordinary skill in the art will appreciate that the description proceeds with titles and examples in order to instruct the reader, and that once the concepts are grasped, aspects of the features are applied in practice with no such pedagogical limitations.

Example Adaptive Video Coding Method

Figure 8:
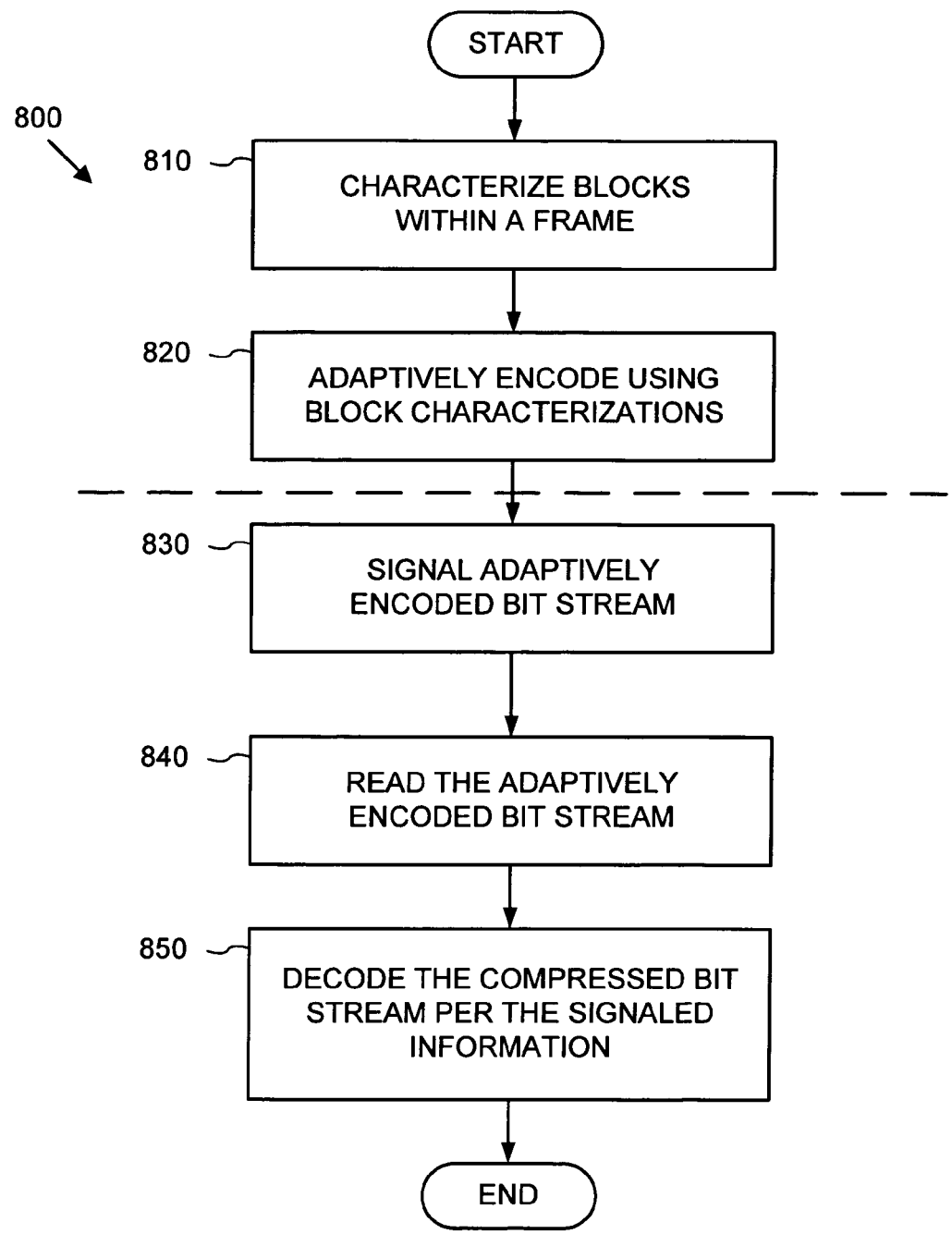
FIG. 8 is a flow chart of an adaptive video encoding method.

FIG. 8 is a flow chart of an example method of adaptive video encoding using a perceptual model. One aspect of adaptive encoding in the method is to provide a characterization for the level of detail in a block. For example, blocks representing relatively smooth regions in a video frame, such as a blue sky, may be characterized as less acceptable for introducing distortion. Over simplification of detail representation (e.g., lossy compression of video data) in an encoding scheme can be more easily perceived by humans in such smooth regions. In contrast, texture regions can often be lossy compressed relatively further without human perception of the added distortion. For example, a forest of trees may be characterized as a texture region that allows greater simplification of detail representation without human perception of the distortion introduced.

With reference to FIG. 8, the video encoder 600 described above implements adaptive encoding techniques in a process 800 that characterizes blocks (e.g., blocks of macroblocks, macroblocks, other regions, etc.) of a video frame (e.g., smooth region, edge region, texture region, etc.) and adapts one or more encoding techniques according to the characterization. The described techniques provided adaptive encoding within a frame, such as on a block, macroblock (MB) or a group of MB basis (e.g., a region, or a "block" generally). The techniques use information to classify different blocks of the image and to encode them accordingly. More particularly, the video encoder 600 characterizes blocks to classify the importance of content within a frame.

At 810, the video encoder 600 characterizes a block based on the determined intensity variance within the block of the video frame. For example, the sum of the differences between a pixel and its adjacent pixels is computed for the pixels in the block. This sum of differences value indicates an extend of intensity variance between a pixel and its surrounding pixels. For example, surrounding pixels comprise two or more other pixels adjacent to or nearly adjacent to a pixel, such as above or below, to the left or right, or diagonal to a pixel. The difference between a pixel's intensity and the intensities of its surrounding pixels is computed based on differences in luminance and/or chrominance data. A computed difference value is assigned to the pixel (e.g., a pixel gradient). A difference value is computed in this way for plural or all pixels in a block (e.g., a block gradient), or for some sub-sampled set thereof. The difference values assigned to pixels in a block are evaluated to determine a characterization for the block (e.g., a block value). In one example, the pixel gradients for pixels in a block are evaluated to determine a median difference value for the block gradient (e.g., a block median). Optionally, the block value is used to classify a block (e.g., smooth, edge, or texture; texture or non-texture; smooth or non-smooth; etc.). Thus, intensity differences between pixels within a block provide a measure of intensity variance for a block, macroblock, or video frame region (generally, "block").

A block median is not required to determine a block value. An intensity variance or block characterization may also be based on an average value for difference values assigned to pixels in the block (e.g., a block average). The block median or average (e.g., a block value) can be used to classify the block and/or can be used as input to a finer grained control function. The characterization or control function adaptively varies one or more aspects of encoding.

Alternatively, instead of computing an intensity variance to characterize a block, the encoder 600 uses another metric to vary adaptive encoding according to one or more of the adaptive encoding variations described herein.

At 820, the encoder adaptively encodes blocks of the video frame based on the block characterization. One or more encoding features are adapted and provided based on the block characterization. In one implementation, an adaptive median filtering is provided based on block characterization. For example, increased median filtering is provided for texture regions. An isolated last non-zero transform coefficient may be dropped, for example, in texture regions. An adaptive adjustment of a dead zone is provided during transform coefficient quantization if desirable in texture regions. A differential quantization pattern is applied during transform coefficient quantization, for example, in smooth regions vs. non-smooth regions, and the differential quantization information is signaled in an output bit stream. In common encoding scenarios, regions classified as texture are quantized more strongly, which saves bits.

Although FIG. 8 shows the characterizing stage 810 preceding the adaptive encoding stage 820 for multiple blocks in a frame, these stages may also occur iteratively on a block-by-block basis in the frame or be ordered on some other basis.

At 830, the encoder signals the adaptively encoded bit stream. When differential quantization is used by the encoder to encode based on block characterization, for example, the video encoder 600 encodes information in the compressed bit stream using a signaling scheme described below for signaling the differential quantization to the video decoder 700.

At 840, a corresponding video decoder 700 reads the adaptively encoded bit stream. For example, the video decoder 700 reads the signaled differential quantization information. At 850, the decoder 700 decodes the compressed bit stream, for example, dequantizing blocks according to signaled differential quantization information.

Example Region Detection or Classification

Figure 9:
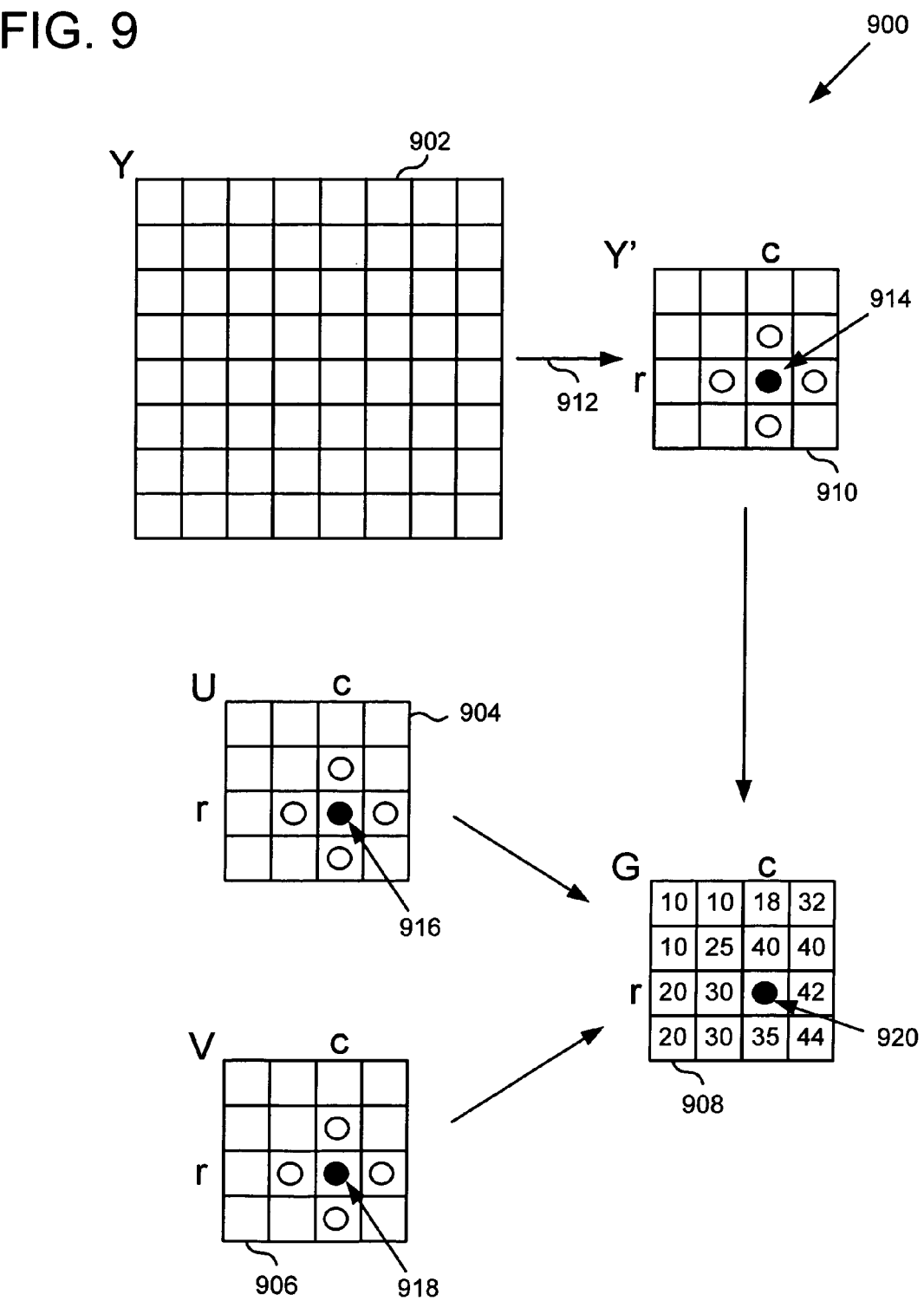
FIG. 9 is a diagram showing computation of a pixel gradient using luminance and chrominance data.

FIG. 9 is a diagram showing block-based 900 region detection or characterization using luminance and/or chrominance data. The luminance block "Y" shown 902 is an 8×8 block. Although not required, in this example, chrominance blocks 904, 906 for the pixel block are also used in computing a gradient block 908. Although not required, as shown in this example, the luminance block 902 is downsampled 912 by a factor of 2 horizontally and vertically (e.g., by simple averaging of pairs of pixels) to create a luminance block 910 that matches the 4×4 dimensions of the chrominance blocks.

As shown in the downsampled luminance block 910, a pixel 914 is compared to four pixels near it, and a sum of the difference between the pixel 914 and its surrounding vertical and horizontal pixels is computed. In this example, the pixel 914 is located at position Y'(r, c). Thus an equation provides the sum of the differences for luminance intensity values for this pixel 914 as compared to its surrounding pixels:

$$L_1(r,c)=[|Y'(r,c)-Y'(r,c-1)|+|Y'(r,c)-Y'(r-1,c)|+|Y'(r,c)-Y'(r,c+1)|+|Y'(r,c)-Y'(r+1,c)|]/4$$

As shown, Y'(r, c) is the luminance component of the pixel 914 at row r and column c in the downsampled block Y'. The output of the equation $L_1$ provides an indication of how the pixel 914 differs in luminance intensity from its pixel neighbors within the block Y'. This luminance intensity difference measurement is an example of a pixel gradient.

Optionally, chrominance data 904, 906 may be considered alone instead of luminance data, or may be considered together with luminance data to determine intensity differences for region detection or classification. Thus, an equation for the sum of the differences for luminance intensity values and chrominance intensity values for corresponding pixels 914, 916, 918 in luminance and chrominance blocks for the pixel block can be represented as the average of the differences in intensity values of the surrounding pixels as shown in the following equation:

$$G_1(r,c)=\{[|Y(r,c)-Y(r,c-1)|+|Y(r,c)-Y(r-1,c)|+|Y(r,c)-Y(r,c+1)|+|Y(r,c)-Y(r+1,c)|]+[|U(r,c)-U(r,c-1)|+|U(r,c)-U(r-1,c)|+|U(r,c)-U(r,c+1)|+|U(r,c)-U(r+1,c)|]+[|V(r,c)-V(r,c-1)|+|V(r,c)-V(r-1,c)|+|V(r,c)-V(r,c+1)|+|V(r,c)-V(r+1,c)|]\}/12$$

The output of the equation $G_1(r, c)$ is an example of a pixel gradient for the pixel located at (r, c), and the pixel gradient provides an indication of how the pixel 914, 916, 918 differs in luminance and chrominance intensity from its surrounding pixel neighbors. In this example, the pixel gradient value $G_1(r, c)$ is based only on pixels that are immediately vertical or horizontal, but does not consider other pixels in the neighborhood. It is contemplated that other pixel data may also be considered in creation of a pixel gradient in other variations of region detection or classification. For example, diagonal pixels could be considered as part of, or instead of the provided arrangement. Or, intensity differences across a longer stretch (e.g., 2 or 3 pixels) could be considered.

Notice also, that the output of the preceding equation provides only an indication of how a single pixel differs from its neighbors in luminance and chrominance intensity. In order to characterize the intensity variance for an entire block, the same analysis is performed on plural or all pixels within the block. In one such example, a block 908 of pixel gradients is created that contains plural pixel gradients, and a block gradient is derived therefrom. A block gradient provides a more complete indication of how pixels within a block differ in intensity from each other. As noted, computing a pixel gradient or a gradient block may include luminance comparisons alone, chrominance comparisons alone, or both luminance and chrominance comparisons together.

If desirable, the above equation $G_1(r, c)$ may be varied to account for missing block boundary values. For example, pixels outside the block may be extrapolated or assumed to be the same as other adjacent pixel data within the block when adapting the equation $G_1(r, c)$ to account for boundary values. Or, the denominator of the equations may be reduced and surrounding pixels in certain directions ignored in the comparisons, for example, where those surrounding pixels are outside of the block. As shown, a block 908 of pixel gradients may provide pixel gradient data for all pixels in the block. Or, a block 908 of pixel gradients may include pixel gradient data for less than all pixels in the block.

Example Selection of Block Value

Figure 10:
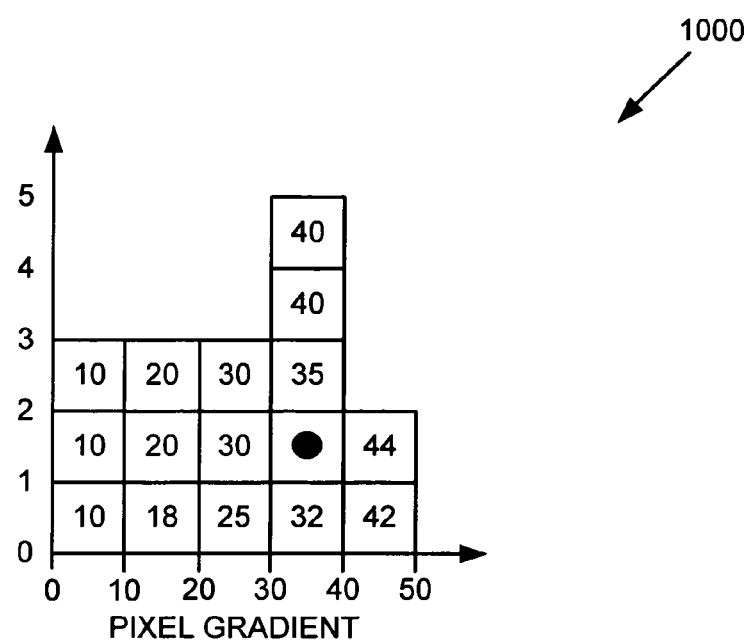
FIG. 10 is a histogram graph of plural pixel gradients.

FIG. 10 is a histogram graph of plural pixel gradients in the block 908 of FIG. 9. More specifically, the histogram 1000 provides a visualization of how a block is characterized or valued. In this example, there are eight pixel gradient values below 30, and eight pixel gradient values above 30. Thus, a median value for this block gradient is 30. (For an even number of candidates, the median can be computed as the average of the two middle candidate values, or as one or the other of the two middle candidate values.) The median value may be used to determine a label for the block as smooth, texture, or edge.

Of course, other metrics may be used to characterize or value blocks once the pixel gradients or blocks of pixel gradients are obtained. For example, blocks may be characterized according to an average of pixel gradient values. Finally, once a block value is assigned it can be used in a characterization scheme (e.g., smooth or non-smooth; smooth, texture, edge; etc.) or in a finer grained control function, in order to determine how the block value is used in an adaptive encoding strategy.

Thus, a block median may be selected by ordering plural pixel gradients and selecting a median gradient value from the ordered values. For example, a sample set of pixel gradients within a block, such as {10, 14, 28, 36, 38}, will have a block value assigned equal to the median pixel gradient in the set, or 28. In another example, a block value is determined based on the average gradient in the set, or 25.2. Of course, the set may be obtained from a complete block gradient, or a subset thereof.

Example Use of Region Classification Information

As previously discussed, a block is valued according to some region detection or classification scheme. For example, a region type depends on a gradient index histogram. One or more various encoding mechanisms are adapted using the block characterization or value.

Figure 11:
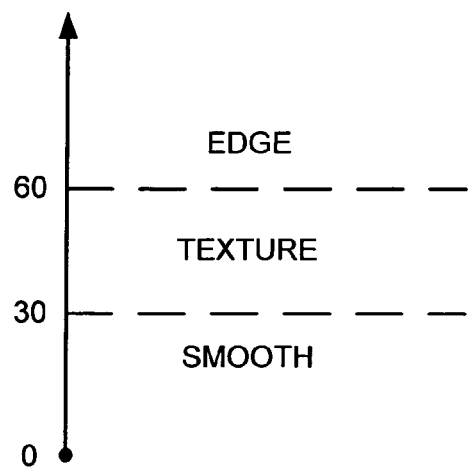
FIG. 11 is a graph of an example block value characterization framework.

FIG. 11 is a graph of an example block value characterization, continuing the example of FIGS. 9 and 10. As shown, a block value in the range from 0 up to and including 30 will be characterized as a smooth block. A block value in the range of greater than 30 but less than or equal to 60 will be characterized as a texture graph, and a block value greater than 60 will be assigned an edge characterization.

Table 1 provides an adaptive coding scheme using block characterizations as described with reference to FIG. 11. As shown, blocks will be coded distinctly in terms of one or more adaptive features. For example, four features are proposed as follows:

TABLE 1

| Characterization | Median Filter | Drop-Last-Coef | Dead Zone | D-Quant |
|---|---|---|---|---|
| Smooth | Weak | No | No | Lower QP |
| Edge | Weak | No | No | Higher QP |
| Texture | Strong | Yes | Yes | Higher QP |

In Table 1, the term QP denotes a quantization size. The various adaptive features are discussed throughout this document and will be further discussed below. Alternatively, an encoder uses another mapping of adaptive feature decisions to block characterizations.

Example Adaptive Median Filtering

Optionally, an encoder provides a median filter in different sizes or strengths based on different block characterizations. In the encoder 600 of FIG. 6, an adaptive median filter 607 is applied to the prediction residual 645, where the region detector provides information 608 comprising a block classification used to determine an adaptive filter.

As known in the art, simple translational motion estimation and compensation involve prediction with a motion vector which indicates how to move a set of pixels or a block. The movement of the set of pixels or block is expressed as a displacement of pixels. The simple displacement of a set of pixels or block often causes a prediction error. Thus, a bit stream often includes an error block for mitigating this prediction error. When motion compensation works, encoding a block of prediction error or residual data requires fewer bits than encoding the same area with intraframe compression, because the prediction error often includes less energy.

Even when motion compensation succeeds for a block, there may be information content in the prediction residual for the block. The information content appears as isolated, "salt and pepper" noise values among areas with zero residual values for motion-compensated prediction has mostly succeeded, or the information content may appear as edges where a new part of an object has been exposed that was not in a reference frame. A median filter tends to smooth residual information (removing isolated noise values) while at the same time preserving useful detail (such as edges) in the residual information. The smoothing adds redundancy, which makes subsequent lossless compression more efficient. To control how much the video information is filtered, the video encoder changes the median filter kernel applied to the residual information based upon the block characterizations.

For example, for a texture region, a strong 5×5 median filter is used to filter the prediction residual. A weak 3×1 median filter is used to filter the prediction residual for a smooth region or an edge region. In the encoder 600 of FIG. 6, the median filter is applied to the motion compensation errors block before the errors block 335 is encoded using the frequency transformer 660 and quantizer 670. Alternatively, other and/or additional median filter kernel shapes and sizes are available for the adaptive median filtering.

Optionally, a user is provided the opportunity to vary the median filter. For example, a user may select stronger median filtering. In one such implementation, a strong 5×5 median filter is used for texture regions while a weak 3×3 filter is used for smooth or edge regions.

A stronger filter is applied to texture regions because, when distortion must be introduced to meet coding constraints, human perception is less sensitive to distortion introduced in the texture regions, whereas human perception is more sensitive to distortion introduced in smooth regions. Further variations in median filters are contemplated for adaptive encoding as computing resources increase.

Example Adaptive Isolated Transform Coefficient Dropping

Before a block of transform coefficients is entropy coded using run length coding, run level coding, or many other types of entropy coding, the block of transform coefficients is scanned into a one-dimensional array according to a scan pattern (often called a zigzag pattern). After quantization of the transform coefficients (and even before quantization to some extent), one common pattern in the transform coefficients is to have non-zero values at the start of the array (corresponding to the low frequency coefficients conventionally shown at the top left of a two-dimensional block), followed by mostly zero values, followed by an isolated non-zero transform coefficient (corresponding to a high frequency coefficient conventionally shown at the bottom right of the two-dimensional block). For example, for an 8×8 block of quantized transform coefficients (64 values), the resulting scan often has only a few non-zero coefficients at the beginning followed by many zeros, and then possibly just a few more non-zero coefficients at the end (e.g., 700, 90, 90, −89, 0, 100, 0, 0, 0, . . . , 500).

Figure 12:
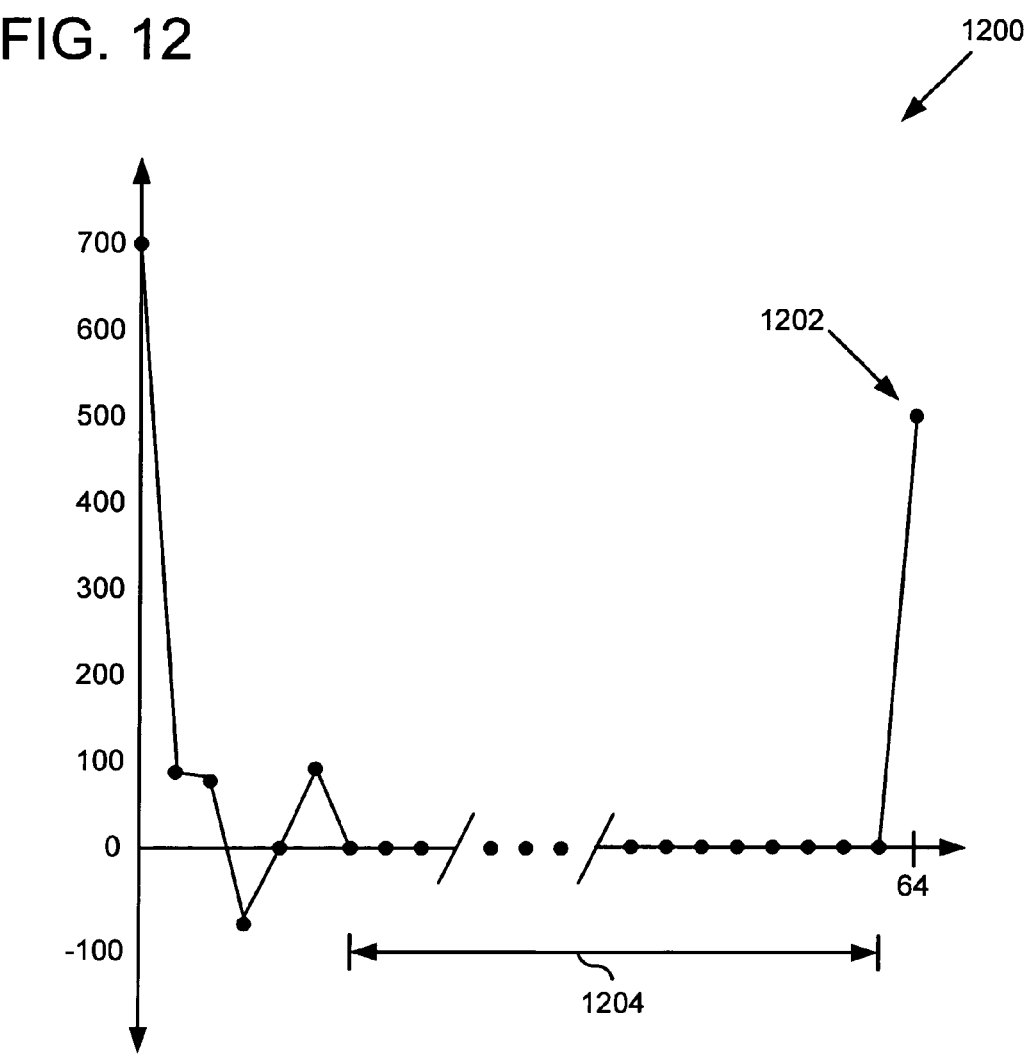
FIG. 12 is a graph of an example scan of a block of transform coefficients, showing a trailing non-zero coefficient.

FIG. 12 is a graph of an example scan of a block of transform coefficients. As shown in the example graph 1200, an isolated last non-zero coefficient 1202 is defined as the last non-zero transform coefficient of each block that has a large run value 1204 for zero-value coefficients (e.g.; run value greater than some threshold), after zigzag scanning. The cost of entropy coding such an isolated, trailing non-zero coefficient 1202 is often high, relative to the benefits of coding the coefficient 1202 in term of quality improvement.

Optionally, an encoder provides an adaptive quantizer 670 or other module, that drops the last non-zero coefficient(s) in the scan, based on a characterization of the perceptual region. For example, the last non-zero coefficient(s) may be dropped in texture or edge regions, or just for texture regions.

In another example, if a block is characterized as a texture block, and there is a certain number of zeros before a last non-zero coefficient (e.g., 40 zeros, 50 zeros, 60 zeros, etc.), the last non-zero coefficient is dropped (changed to zero). The number of zeros is contemplated to vary depending on the desired likelihood for dropping trailing coefficients, evolving computing efficiency, a desired level of detail, and/or a user indication of desired detail.

Example Adaptive Dead-Zone During Quantization

Optionally, adaptive sizing of a dead zone is used during quantizing the transform coefficients. A dead-zone is the region within which zero output is generated for some transform coefficient during quantization.

Table 2 is an example of how an encoder adaptively quantizes transform coefficients by changing the size of the dead zone.

TABLE 2

| Coeff Value | Quantized Smooth | Quantized Edge or Texture |
|---|---|---|
| 0 < x ≦ 100 | 0 | 0 |
| 100 < x ≦ 200 | 1 | 0 |
| 200 < x ≦ 300 | 2 | 0 |
| 300 < x ≦ 400 | 3 | 0 |
| 400 < x ≦ 500 | 4 | 1 |
| 500 < x ≦ 600 | 5 | 2 |
| 600 < x ≦ 700 | 6 | 3 |
| 700 < x ≦ 800 | 7 | 4 |
| 800 < x ≦ 900 | 8 | 5 |

As shown in Table 2, a larger dead-zone is used for edge regions or texture regions. For a smooth region, a transform coefficient with a magnitude of anything less than or equal to 100 is assigned a quantized value of 0, and typically will be reconstructed as 0. For a non-smooth region, a transform coefficient with a magnitude of anything less than or equal to 400 is assigned a quantized value of 0, and typically will be reconstructed as 0. As a result, the non-smooth regions are more likely to include redundancy (due to introduction of distortion), and fewer bits will be required in lossless compression to represent the non-smooth regions as compared to smooth regions.

In the encoder of FIG. 6, the region detector 606 provides information 608 that an adaptive quantizer 670 uses to adaptively quantize the transform coefficients according to a block characterization. For example, a larger dead-zone may be applied to texture or edge regions, and a smaller dead zone for smooth regions.

Figure 13:
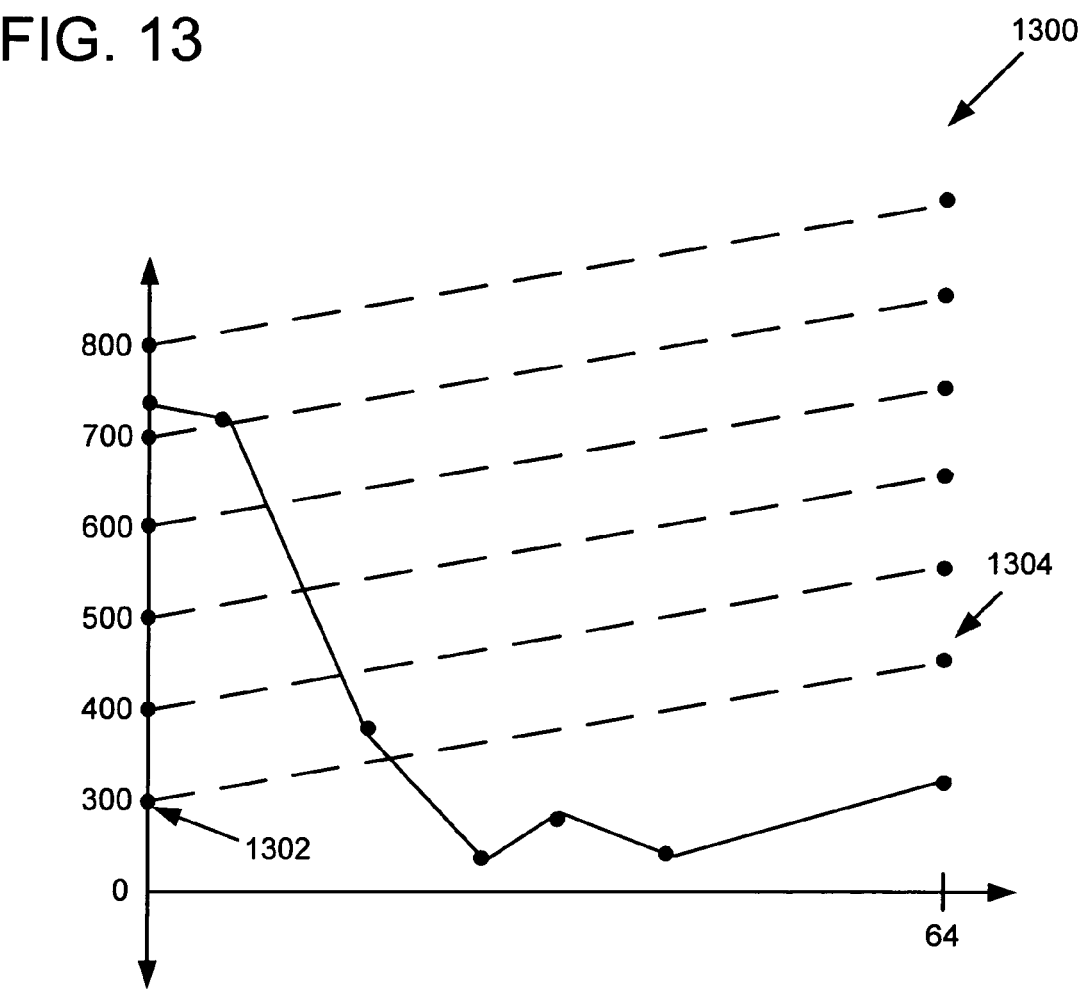
FIG. 13 is a graph of a frequency dependent dead-zone quantizer function.

In another example, an encoder adaptively quantizes transform coefficients in a frequency dependent manner (or, in practice, in a manner that depends on order in a one-dimensional array following zigzag scanning). FIG. 13 is a graph of a frequency dependent dead-zone quantizer function. As shown in the graph 1300, the dead-zone (initially, 0-300) 1302 increases in size as the frequency of coefficients increases (finally, 0-450) 1304. In the encoder 600 of FIG. 6, the region detector 606 characterizes a block as a texture or edge block, and this information 608 may be utilized by an adaptive quantizer 670 to provide frequency or order dependent dead zone resizing as shown in the increasing dead-zone function 1300 of FIG. 13.

Although a fine-grained function is shown in FIG. 13, this is not required. In another example, an adaptive quantizer provides low frequency quantization (for the first 32 coefficients of the scan) with different dead zone size than high frequency quantization (for the last 32 bits of the scan). Table 3 shows an adaptive quantization scheme with different dead zone sizes for on low-frequency and high-frequency coefficients.

TABLE 3

| Coeff Value | Low Frequency | High Frequency |
|---|---|---|
| $0 < x \leq 100$ | 0 | 0 |
| $100 < x \leq 200$ | 1 | 0 |
| $200 < x \leq 300$ | 2 | 0 |
| $300 < x \leq 400$ | 3 | 0 |
| $400 < x \leq 500$ | 4 | 1 |
| $500 < x \leq 600$ | 5 | 2 |
| $600 < x \leq 700$ | 6 | 3 |
| $700 < x \leq 800$ | 7 | 4 |
| $800 < x \leq 900$ | 8 | 5 |

Quantization for different dead zone sizes depending on frequency/order may be used in conjunction with or instead of different dead zone sizes for different types of content/block characterizations.

Moreover, for the sake of simplicity, Tables 2 and 3 and FIG. 12 illustrate a coarse quantization with a quantization step size of 100. In practice, other quantization step sizes (e.g., 1, 2, 4, 6, etc.) are typically used, where the different quantization step sizes essentially trade off bit rate versus quality/fidelity. The dead zone sizes for these step sizes may similarly vary depending on block characterization and/or coefficient order. For example, the dead zone size is 1* the quantization step size in a first quantizer used for one kind of block, and it is 2* the quantization step size in a second quantizer used for another kind of block.

When blocks are a quantized distinctly, quantizer selection information may be provided to the decoder (along with step size information) as side information.

Alternatively, instead of using separate quantizers for different dead zone sizes, a single quantizer is used with different effective dead zone sizes for different types of blocks. In other words, the same set of quantized value tokens is basically used for coefficients regardless of dead zone size, but when the dead zone size is increased, the zero-value token is simply used for the one-value token, two-value token, etc. to map a wider range of coefficients around zero to the quantized value of zero. The other tokens (e.g., three-value token, four-value token, etc.) are the same. The one-value token, two-value token, etc. are unused, which makes entropy coding a bit less efficient, but selection between different quantizers and reconstruction rules is not needed.

Example Differential Quantization

Using differential quantization, an encoder may apply coarser quantization to some blocks while applying finer quantization to other blocks, depending on the block characterizations for those blocks. For example, smooth regions in a picture are coded with lower QP while texture regions or edge regions are coded with higher QP. This scheme will save bits in texture or edge regions by introducing distortion not likely to be noticed, and improve the overall perceptual quality of the encoded video.

The concept of differential quantization (often called D-Quant for short) is that macroblocks or other blocks within a video frame can be quantized using different quantization values (e.g., QPs). The quantization values for the decoder to use in reconstruction are then signaled in the bitstream.

An example syntax describes how macroblock level QP (MQUANT) is reconstructed at a decoder. A video clip header may indicate whether bi-level quantization is employed. Then, if bi-level quantization is employed, for each video frame within the clip, a syntax element indicates a bi-level profile for the frame (e.g., DQPROFILE=AllMacroblocks) 1402.

Figure 14:
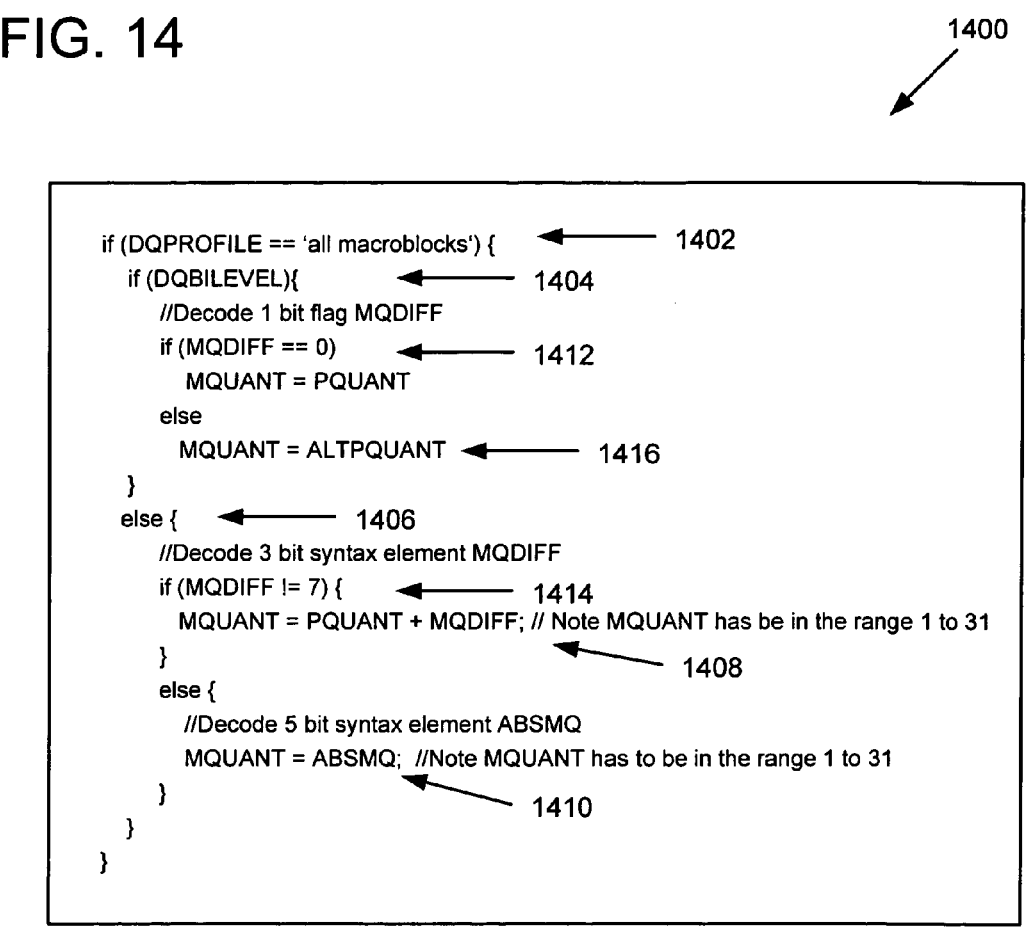
FIG. 14 is a program listing of an example method of differential quantization.

FIG. 14 is a program listing of an example method of differential quantization 1400. Alternatively, the encoder and decoder use another signaling syntax.

With reference to the pseudocode in FIG. 14, MQUANT is used by a decoder to dequantize a block. Thus, MQUANT is reconstructed at the decoder according to the program listing 1400.

The method determines whether the frame contains differential quantization 1402. Next, the method determines 1404 whether a macroblock is assigned one of two bi-level quantization values (e.g., PQUANT or ALTQUANT), or whether MQUANT is assigned 1406 for a macroblock by one of two equations 1408, 1410.

For example, a frame header may provide information from which PQUANT and ALTPQUANT are reconstructed as default quantization values.

If a simple bi-level quantization is indicated for the frame 1404, the method determines which default value to use by a single bit in a macroblock header 1412.

If an assigned quantization is indicated 1406, then if MQDIFF is not equal to seven 1414, then MQUANT is set equal to PQUANT plus MQDIFF. However, if MQDIFF is equal to seven, then MQUANT is set according to a five bit value for a given macroblock.

MQDIFF is a variable-sized syntax element present in certain macroblocks in I and P frames. The MQDIFF element is present when the picture layer syntax element DQPROFILE is set to indicate 'All Macroblocks'. The syntax depends on the DQBILEVEL syntax element as described below.

If DQBILEVEL=1, then MQDIFF is a 1 bit syntax element and the ABSMQ syntax element does not follow in the bitstream. If MQDIFF=zero 1412, then MQUANT=PQUANT (meaning that PQUANT is used to dequantize the current macroblock). If MQDIFF=one 1416, then MQUANT=ALTPQUANT.

If DQBILEVEL=zero 1406, then MQDIFF is a 3 bit syntax element present in the bit stream. In this case MQDIFF decodes either to an MQUANT differential or to an escape code as follows. If MQDIFF does not equal seven 1410, then MQDIFF is the differential added to PQUANT, and the ABSMQ syntax element does not follow in the bitstream. If MQDIFF is seven 1410, ABSMQ directly encodes the value of MQUANT.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of the invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. In a computing device that implements a video encoder, a method comprising, with the computing device, for each of plural blocks to be encoded using adaptive inter-picture compression:
    classifying the block according to content of the block, wherein the classifying the block includes:
        determining a block gradient for the block to be encoded using the adaptive inter-picture compression, including:
            downsampling luminance samples for the block; and
            determining a pixel gradient for each of plural pixels within the block, the pixel gradient being between one or more samples for the pixel and one or more corresponding samples for surrounding pixels, wherein the pixel gradient is quantified as a sum of differences between the samples for the pixel and the one or more corresponding samples for surrounding pixels, wherein the sum of differences is determined based upon both the luminance samples and chrominance samples for the block, and wherein the downsampling of the luminance samples is performed before the sum of differences is determined; and
        evaluating the block gradient to determine a block value; and
    adaptively encoding the block using adaptive inter-picture compression and depending at least in part upon the block classification, wherein the adaptive encoding includes using two or more of:
        adaptive median filtering depending at least in part on the block classification, selective dropping of a last non-zero transform coefficient depending at least in part on the block classification,
        adaptive dead zone re-sizing depending at least in part on the block classification, or
        quantization step size adjustment depending at least in part on the block classification.

2. In a computing device that implements a video encoder, a method comprising, with the computing device, for each of plural blocks:
    classifying the block according to its content, wherein the classifying the block includes:
        determining a block gradient, including determining a pixel gradient for each of plural pixels within the block, wherein the pixel gradient is quantified as a sum of differences between samples from the pixel and corresponding samples from neighboring pixels, and wherein the samples include both luminance and chrominance samples; and
        evaluating the block gradient to determine a block value; and
    adaptively encoding the block using adaptive inter-picture compression and depending at least in part upon the block classification, wherein the adaptive encoding includes using selective dropping of a last non-zero transform coefficient, wherein the selective dropping of a last non-zero coefficient depends at least in part on the block classification and a number of consecutive zero coefficients preceding the last non-zero coefficient in a zig-zag scan, and wherein the adaptive encoding further includes using one or more of:
        adaptive median filtering,
        adaptive dead zone re-sizing, or
        quantization step size adjustment.

3. The method of claim 2 wherein evaluating the block gradient to determine the block value comprises ordering pixel gradient values numerically and selecting a median value as the block value.

4. The method of claim 2 wherein the adaptive median filtering includes changing filter dimensions depending on the block classification, and wherein the adaptive median filtering is performed on a motion compensation prediction residual as part of the adaptive inter-picture compression of the block.

5. The method of claim 2 wherein the determining the pixel gradient comprises using only pixel data from the plural pixels within the block.

6. The method of claim 2 wherein the block value is determined based on an average of pixel gradients.

7. The method of claim 2 wherein the block value is determined based on a median of pixel gradients.

8. The method of claim 2 wherein the adaptive encoding includes using the quantization step size adjustment, and wherein the quantization step size adjustment includes applying differential quantization depending at least in part on the block classification.

9. The method of claim 2 wherein the adaptive encoding further comprises applying adaptive quantization dependent upon:
    a characterization of the block, and
    a frequency characterization of a coefficient within a block.

10. The method of claim 2 wherein the adaptive encoding includes using the adaptive dead zone re-sizing, and wherein the adaptive dead zone re-sizing includes switching between plural quantizer dead zone sizes depending at least in part on the block classification.

11. A video decoder, decoding an output of an encoder performing the method of claim 2.

12. In a computing device that implements a video encoder, a method comprising:
  with the computing device that implements the video encoder, for each of plural blocks of video data, classifying the block according to content of the block and adaptively encoding the block based at least in part upon the block classification, wherein the adaptive encoding includes selective dropping of a last non-zero transform coefficient depending at least in part on the block classification, wherein the selective dropping of a last non-zero coefficient further depends at least in part on a number of consecutive zero coefficients preceding the last non-zero coefficient in a zig-zag scan, and wherein the adaptive encoding further includes using one or more of:
    adaptive median filtering depending at least in part on the block classification,
    adaptive dead zone re-sizing depending at least in part on the block classification, or
    quantization step size adjustment depending at least in part on the block classification.

13. The method of claim 12, wherein the classifying the block includes:
  determining a block gradient for the block, including determining a pixel gradient for each of plural pixels of the block, the pixel gradient between one or more samples for the pixel and one or more corresponding samples from surrounding pixels; and
  evaluating the block gradient to determine a block value.

14. The method of claim 13 wherein the block classification is based at least in part on the block value, the block classification comprising one of smooth, texture, and edge.

15. The method of claim 13 wherein the block value is determined based on an average of pixel gradients.

16. The method of claim 13 wherein the block value is determined based on a median of pixel gradients.

17. The method of claim 12 wherein the adaptive median filtering includes changing filter dimensions depending on the block classification, and wherein the adaptive median filtering is performed on a motion compensation prediction residual as part of the adaptive encoding.

18. The method of claim 12 wherein the adaptive encoding includes using the quantization step size adjustment, and wherein the quantization step size adjustment includes applying differential quantization depending at least in part on the block classification.

19. The method of claim 12 wherein the adaptive encoding further comprises applying adaptive quantization dependent upon:
  a characterization of the block, and
  a frequency characterization of a coefficient within a block.

20. The method of claim 12 wherein the adaptive encoding includes using the adaptive dead zone re-sizing, and wherein the adaptive dead zone re-sizing includes switching between plural quantizer dead zone sizes depending at least in part on the block classification.

21. A computing device that implements a video encoder, the computing device comprising a processor, memory and storage that stores computer-executable instructions for causing the processor to perform a method comprising, for each of plural blocks of video data:
  classifying the block according to content of the block and adaptively encoding the block based at least in part upon the block classification, wherein the adaptive encoding includes selective dropping of a last non-zero transform coefficient depending at least in part on the block classification, wherein the selective dropping of a last non-zero coefficient further depends at least in part on a number of consecutive zero coefficients preceding the last non-zero coefficient in a zig-zag scan, and wherein the adaptive encoding further includes using one or more of:
    adaptive median filtering depending at least in part on the block classification,
    adaptive dead zone re-sizing depending at least in part on the block classification, or
    quantization step size adjustment depending at least in part on the block classification.

22. A computing device that implements a video encoder, the computing device comprising a processor, memory and storage that stores computer-executable instructions for causing the processor to perform a method comprising, for each of plural non-encoded blocks to be encoded using adaptive inter-picture compression:
  classifying the block according to content of the block, wherein the classifying the block includes:
    determining a block gradient for the block to be encoded using the adaptive inter-picture compression, including:
      downsampling luminance samples for the block; and
      determining a pixel gradient for each of plural pixels within the block, the pixel gradient being between one or more samples for the pixel and one or more corresponding samples for surrounding pixels, wherein the pixel gradient is quantified as a sum of differences between the one or more samples for the pixel and the one or more corresponding samples for surrounding pixels, wherein the sum of differences is determined based upon both the luminance samples and chrominance samples for the block, and wherein the downsampling of the luminance samples is performed before the sum of differences is determined; and
    evaluating the block gradient to determine a block value; and
  adaptively encoding the block using the adaptive inter-picture compression and depending at least in part upon the block classification, wherein the adaptive encoding includes using two or more of:
    adaptive median filtering depending at least in part on the block classification,
    selective dropping of a last non-zero transform coefficient depending at least in part on the block classification,
    adaptive dead zone re-sizing depending at least in part on the block classification, or
    quantization step size adjustment depending at least in part on the block classification.

23. In a computing device that implements a video encoder, a method comprising, with the computing device, for each of plural non-encoded blocks to be encoded using adaptive inter-picture compression:
  classifying the block according to its content, wherein the classifying the block includes:
    determining a block gradient, including determining a pixel gradient for each of plural pixels within the block, the pixel gradient between one or more samples for the pixel and one or more corresponding samples from surrounding pixels; and evaluating the block gradient to determine a block value, wherein the evaluating comprises ordering pixel gradient values numerically and selecting a median value as the block value; and adaptively encoding the block using the adaptive inter-picture compression and depending at least in part upon the block classification, wherein the adaptive encoding includes using selective dropping of a last non-zero coefficient, wherein the selective dropping of a last non-zero coefficient depends at least in part on a number of consecutive zero coefficients preceding the last non-zero coefficient in a zig-zag scan, and wherein the adaptive encoding further includes using one or more of:

adaptive median filtering, adaptive dead zone re-sizing, or quantization step size adjustment.

24. The computing device of claim 23 wherein the block value is determined based on an average of pixel gradients.

25. The computing device of claim 23 wherein the block value is determined based on a median of pixel gradients.

26. The computing device of claim 23 wherein the adaptive encoding further comprises applying adaptive quantization dependent upon:

a characterization of the block, and a frequency characterization of a coefficient within a block.

* * * * *